(12) United States Patent
Taylor

(10) Patent No.: US 8,131,663 B1
(45) Date of Patent: Mar. 6, 2012

(54) APPARATUS FOR GENERATING SOFTWARE LOGIC RULES BY FLOWCHART DESIGN

(76) Inventor: Bonamy Taylor, Columbia, SC (US)

( * ) Notice: Subject to any disclaimer, the term of this patent is extended or adjusted under 35 U.S.C. 154(b) by 814 days.

(21) Appl. No.: 12/249,995

(22) Filed: Oct. 13, 2008

Related U.S. Application Data

(60) Provisional application No. 60/979,505, filed on Oct. 12, 2007.

(51) Int. Cl.
*G06F 17/00* (2006.01)
*G06F 9/44* (2006.01)
*G06N 7/00* (2006.01)
*G06N 7/08* (2006.01)

(52) U.S. Cl. .......................... 706/59; 717/109
(58) Field of Classification Search ................. None
See application file for complete search history.

(56) References Cited

U.S. PATENT DOCUMENTS

| | | | |
|---|---|---|---|
| 5,442,792 A | 8/1995 | Chun | |
| 5,734,837 A * | 3/1998 | Flores et al. ................. | 705/7.13 |
| 5,774,661 A | 6/1998 | Chatterjee et al. | |
| 6,170,002 B1 | 1/2001 | Ouchi | |
| 6,253,369 B1 | 6/2001 | Cloud et al. | |
| 6,279,042 B1 | 8/2001 | Ouchi | |
| 6,370,567 B1 | 4/2002 | Ouchi | |
| 6,442,594 B1 | 8/2002 | Ouchi | |
| 6,539,404 B1 | 3/2003 | Ouchi | |
| 6,697,784 B2 | 2/2004 | Bacon et al. | |
| 6,728,947 B1 | 4/2004 | Bengston | |
| 6,823,513 B1 | 11/2004 | McNally et al. | |
| 6,868,441 B2 | 3/2005 | Greene et al. | |
| 6,876,889 B1 | 4/2005 | Lortz et al. | |
| 6,877,153 B2 | 4/2005 | Konnersman | |
| 6,920,456 B2 | 7/2005 | Lee et al. | |
| 6,922,685 B2 | 7/2005 | Greene et al. | |
| 7,043,714 B2 | 5/2006 | Lin et al. | |

(Continued)

FOREIGN PATENT DOCUMENTS

EP 1003 114 A1 11/1998

(Continued)

OTHER PUBLICATIONS

Yau, Stephen S. et al.; "Visual Languages and Software Specifications"; 1988; IEEE; pp. 322-328.*

(Continued)

*Primary Examiner* — Jeffrey A Gaffin
*Assistant Examiner* — Stanley K Hill
(74) *Attorney, Agent, or Firm* — Michael A. Mann; Nexsen Pruet, LLC

(57) ABSTRACT

A apparatus implemented using a programmable computer that automatically generates the rules required by a software rules engine as a process flow diagram is designed. The apparatus includes a developer interface; an editing interface, and a rules generator. A developer interface enables the user to define functions and variables together with their properties from the business application. An editing interface allows the user to define the logical rules the business would follow in performing the business application by constructing a process flow diagram and associated tables using the functions and variables defined in the developer interface. The rules generator then automatically parses the flow diagrams and tables defined by the business user and, using the functions and variables defined in the developer interface, generates rules for a rules engine. The rules can then be deployed to a controller that implements the process automatically based on the input rules.

23 Claims, 36 Drawing Sheets

U.S. PATENT DOCUMENTS

| | | | |
|---|---|---|---|
| 7,047,535 B2 | 5/2006 | Lee et al. | |
| 7,065,493 B1 | 6/2006 | Homsi | |
| 7,069,536 B2 | 6/2006 | Yaung | |
| 7,100,147 B2 | 8/2006 | Miller et al. | |
| 7,150,000 B1 | 12/2006 | Feldman | |
| 7,152,053 B2 | 12/2006 | Serrano-Morales et al. | |
| 7,184,967 B1 | 2/2007 | Mital et al. | |
| 7,277,895 B2 | 10/2007 | Serrano-Morales et al. | |
| 7,296,056 B2 | 11/2007 | Yaung | |
| 7,302,483 B1 | 11/2007 | Carbone et al. | |
| 7,363,628 B2 | 4/2008 | Shukla et al. | |
| 7,373,310 B1 | 5/2008 | Homsi | |
| 7,382,479 B2 | 6/2008 | Hirose et al. | |
| 7,401,131 B2 | 7/2008 | Robertson et al. | |
| 7,409,671 B1 | 8/2008 | Meredith et al. | |
| 7,412,520 B2 | 8/2008 | Sun | |
| 7,412,688 B2 | 8/2008 | Liang et al. | |
| 7,444,314 B2 * | 10/2008 | Rouvellou et al. | 706/47 |
| 2008/0209505 A1 * | 8/2008 | Ghai et al. | 726/1 |
| 2010/0031232 A1 * | 2/2010 | Glazier et al. | 717/106 |

FOREIGN PATENT DOCUMENTS

| | | |
|---|---|---|
| EP | 1065618 A2 | 8/1999 |
| EP | 1643 431 A1 | 9/2005 |
| WO | WO 01/25893 A1 | 4/2001 |
| WO | WO 01/88757 A1 | 11/2001 |
| WO | WO 03/073192 A2 | 2/2003 |
| WO | WO 03/079290 A1 | 9/2003 |
| WO | WO 2004/046832 A | 6/2004 |

OTHER PUBLICATIONS

Sunye, Gerson et al.; "Using UML Action Semantics for model execution and transformation"; 2002; Information Systems 27 (2002); pp. 445-457.*

Bajec, Marko et al.; "A methodology and tool support for managing business rules in organisations"; 204; Elsevier; Information Systems; pp. 1-21.*

Abdullah, Mohn Syazwan et al.; "Using Unified Modeling Language for Conceptual Modelling of Knowledge-Based Systems"; 2007; Springer Verlag; pp. 438-453.*

Declaration of Bonamy Taylor.

* cited by examiner

CONFIGURE VARIABLES

VARIABLES
- AUTOMATIC
  - APPRAISED VALUE
  - CREDIT SCORE
  - INCOME
- CUSTOMER DATA
  - ADDRESS
  - CUSTOMER NAME
- FIELDS
  - ADDRESS FIELD
  - CUSTOMER ID
  - NAME FIELD
  - NOTES
  - STATUS

VALUES

| | |
|---|---|
| NAME: | APPRAISED VALUE |
| VARIABLE NAME: | APPRAISEDVALUE |
| VARIABLE CATEGORY: | PROPERTY |
| REFERENCE NAME: | |
| REFERENCE CATEGORY: | THIS |
| EVALUATION TYPE: | AUTOMATIC |
| | IMPLEMENTED |
| DOMAIN: | AUTOMATIC |
| VARIABLE TYPE: | DECIMAL |
| CONTROL: | SINGLE LINE TEXT BOX |
| COMMENTS: | |

[ IMPORT... ] [ OK ] [ CANCEL ]

FIG.3

CONFIGURE VARIABLES

- 📁 VARIABLES
  - 📁 AUTOMATIC
    - 📄 APPRAISED VALUE
    - 📄 CREDIT SCORE
    - 📄 INCOME
  - 📁 CUSTOMER DATA
    - 📄 ADDRESS
    - 📄 CUSTOMER NAME
  - 📁 FIELDS
    - 📄 ADDRESS FIELD
    - 📄 CUSTOMER ID
    - 📄 NAME FIELD
    - 📄 NOTES
    - 📄 STATUS

VALUES

| | |
|---|---|
| NAME: | ADDRESS FIELD |
| VARIABLE NAME: | ADDRESS FIELD |
| VARIABLE CATEGORY: | PROPERTY ▾ |
| REFERENCE NAME: | MAINVIEW |
| REFERENCE CATEGORY: | FIELD ▾ |
| EVALUATION TYPE: | THIS |
| | TYPE |
| | FIELD |
| DOMAIN: | PROPERTY |
| VARIABLE TYPE: | STRING ▾ |
| CONTROL: | SINGLE LINE TEXT BOX ▾ |
| COMMENTS: | |

[IMPORT...] [OK] [CANCEL]

Fig.4

CONFIGURE VARIABLES

VALUES

- 📁 VARIABLES
  - 📁 AUTOMATIC
    - 📄 APPRAISED VALUE
    - 📄 CREDIT SCORE
    - 📄 INCOME
  - 📁 CUSTOMER DATA
    - 📄 ADDRESS
    - 📄 CUSTOMER NAME
  - 📁 FIELDS
    - 📄 ADDRESS FIELD
    - 📄 CUSTOMER ID
    - 📄 NAME FIELD
    - 📄 NOTES
    - 📄 STATUS

| | |
|---|---|
| NAME: | ADDRESS FIELD |
| VARIABLE NAME: | ADDRESS FIELD |
| VARIABLE CATEGORY: | PROPERTY ▼ |
| | PROPERTY |
| REFERENCE NAME: | FIELD |
| REFERENCE CATEGORY: | FIELD ▼ |
| EVALUATION TYPE: | IMPLEMENTED ▼ |
| DOMAIN: | (COLLECTION) |
| VARIABLE TYPE: | STRING ▼ |
| CONTROL: | SINGLE LINE TEXT BOX ▼ |
| COMMENTS: | |

[ IMPORT... ] [ OK ] [ CANCEL ]

Fig.5

| CONFIGURE FUNCTIONS | |
|---|---|
| ⌹ FUNCTIONS<br>⊟ ⌹ DIALOGS<br>    ▣ CHOOSE<br>    ▣ DISPLAY MESSAGE<br>⊟ ⌹ FIELDS<br>    ▣ APPEND TO NOTES<br>⊟ ⌹ MISC<br>    ▣ MULTIPLY<br>⊟ ⌹ TRANSACTIONS<br>    ▣ GET CUSTOMER DATA | VALUES<br>NAME: [CHOOSE]<br>CODE NAME: [CHOOSE]<br>FUNCTION CATEGORY: [MULTIPLE CHOICE ▽]<br>    STANDARD<br>REFERENCE NAME: DIALOG FORM<br>    MULTIPLE CHOICE<br>REFERENCE CATEGORY: BINARY OPERATOR<br>PARAMETERS LAYOUT: [SEQUENTIAL ▽]<br>PARAMETERS: [(COLLECTION)]<br>RETURN TYPE: [VOID ▽]<br>SUMMARY: [ ] |

[IMPORT...] [OK] [CANCEL]

Fig.6

| CONFIGURE FUNCTIONS | |
|---|---|
| FUNCTIONS<br>└ DIALOGS<br>    ├ CHOOSE<br>    └ DISPLAY MESSAGE<br>└ FIELDS<br>    └ APPEND TO NOTES<br>└ MISC<br>    └ MULTIPLY<br>└ TRANSACTIONS<br>    └ GET CUSTOMER DATA | VALUES<br>NAME: APPEND TO NOTES<br>CODE NAME: APPEND TO NOTES<br>FUNCTION CATEGORY: STANDARD<br>REFERENCE NAME: MAINVIEW<br>REFERENCE CATEGORY: FIELD<br>PARAMETERS LAYOUT: SEQUENTIAL<br>PARAMETERS: (COLLECTION)<br>RETURN TYPE: VOID<br>SUMMARY: |
| | IMPORT... OK CANCEL |

Fig. 7

CONFIGURE FUNCTIONS

VALUES

- 📁 FUNCTIONS
  - 📁 DIALOGS
    - 📄 CHOOSE
    - 📄 DISPLAY MESSAGE
  - 📁 FIELDS
    - 📄 APPEND TO NOTES
  - 📁 MISC
    - 📄 MULTIPLY
  - 📁 TRANSACTIONS
    - 📄 GET CUSTOMER DATA

NAME: MULTIPLY
CODE NAME: MULTIPLY
FUNCTION CATEGORY: BINARY OPERATOR
REFERENCE NAME:
REFERENCE CATEGORY: NONE
　　THIS
PARAMETERS LAYOUT: TYPE
　　FIELD
PARAMETERS: PROPERTY
　　NONE
RETURN TYPE: DECIMAL
SUMMARY:

[IMPORT...] [OK] [CANCEL]

Fig. 8

CONFIGURE FUNCTIONS

| | VALUES | |
|---|---|---|
| 📁 FUNCTIONS | NAME: | GET CUSTOMER DATA |
| 📁 DIALOGS | | |
| 🗏 CHOOSE | CODE NAME: | GET CUSTOMER DATA |
| 🗏 DISPLAY MESSAGE | | |
| 📁 FIELDS | FUNCTION CATEGORY: | STANDARD ⌄ |
| 🗏 APPEND TO NOTES | | |
| 📁 MISC | REFERENCE NAME: | MAINVIEW |
| 🗏 MULTIPLY | | |
| 📁 TRANSACTIONS | REFERENCE CATEGORY: | FIELD ⌄ |
| 🗏 GET CUSTOMER DATA | | |
| | PARAMETERS LAYOUT: | SEQUENTIAL ⌄ |
| | PARAMETERS: | (COLLECTION) |
| | RETURN TYPE: | VOID ⌄ |
| | SUMMARY: | GET CUSTOMER DATA |

[ IMPORT... ]  [ OK ]  [ CANCEL ]

```
INITIAL_3=3
INITIAL_60=60
INITIAL_APPROV=APPROVE
INITIAL_AVTH=APPRAISED VALUE TOO HIGH
INITIAL_BANKRU=BANKRUPT
INITIAL_NOTA=NONE OF THE ABOVE
INITIAL_REJECT=REJECTED
INITIAL_RFB=REJECTED FOR BANKRUPSTY
INITIAL_RFCS=REJECTED FOR CREDIT SCORE
INITIAL_RFI=REJECTED FOR INCOME
INITIAL_UNEMPL=UNEMPLOYED
INITIAL_WOTFAT=WHICH OF THE FOLLOWING APPLIES TO YOU?
```

Fig.19

CONFIGURE DECISIONS

- 📁 DECISIONS
  - 📁 CUSTOMER DATA
    - 📄 ADDRESS
    - 📄 APPRAISED VALUE
    - 📄 CREDIT SCORE
    - 📄 INCOME
    - 📄 NAME

VALUES

NAME: ADDRESS

VARIABLE NAME: address

EVALUATION TYPE: VARIABLE FACT
- VARIABLE FACT
- NONVARIABLE FACT
- CLIPS FUNCTION

DOMAIN:

DEFINITION: ADDRESS ?address

VARIABLE TYPE: STRING

COMMENTS:

[OK] [CANCEL]

Fig.20

CONFIGURE DECISIONS

DECISIONS
- CUSTOMER DATA
  - ADDRESS
  - APPRAISED VALUE
  - CREDIT SCORE
  - INCOME
  - NAME

VALUES

| Field | Value |
|---|---|
| NAME: | INCOME |
| VARIABLE NAME: | income |
| EVALUATION TYPE: | VARIABLE FACT |
| DOMAIN: | (COLLECTION) |
| DEFINITION: | INCOME ?income |
| VARIABLE TYPE: | NUMBER |
| COMMENTS: | |

Dropdown options: SYMBOL, STRING, NUMBER, BOOLEAN, NA

OK    CANCEL

Fig.21

CONFIGURE ACTIONS

- FUNCTIONS
  - DIALOGS
    - CHOOSE
    - DISPLAY MESSAGE
  - FIELDS
    - APPEND TO FIELD
    - SET FIELD
  - MATH
    - MULTIPLY
  - TRANSACTIONS
    - GETCUSTOMERDATA
- REQUIRED FUNCTIONS
  - FLOWCOMPLETE
  - FORMAT STRING
  - TERMINATE

VALUES

| Field | Value |
|---|---|
| NAME: | choose |
| DIAGRAM TEXT: | choose |
| CLIPS TEXT: | choose |
| PARAMETERS: | (COLLECTION) |
| CATEGORY: | MULTIPLE CHOICE |
| SUMMARY: | |
| SELECTION FACT: | CHOOSE |
| RETURN TYPE: | VOID |

[ OK ]  [ CANCEL ]

FIG.22

CONFIGURE ACTIONS

| | VALUES | |
|---|---|---|
| 📁 FUNCTIONS | NAME: | APPEND TO FIELD |
| ⊟📁 DIALOGS | | |
|    📄 CHOOSE | DIAGRAM TEXT: | APPEND TO FIELD |
|    📄 DISPLAY MESSAGE | | |
| ⊟📁 FIELDS | CLIPS TEXT: | append to field |
|    📄 APPEND TO FIELD | | |
|    📄 SET FIELD | PARAMETERS: | (COLLECTION) |
| ⊟📁 MATH | | |
|    📄 MULTIPLY | CATEGORY: | STANDARD ▾ |
| ⊟📁 TRANSACTIONS | | |
|    📄 GETCUSTOMERDATA | SUMMARY: | NOTES, STATUS, ADDRESS, NA |
| 📁 REQUIRED FUNCTIONS | | |
|    📄 FLOWCOMPLETE | SELECTION FACT: | |
|    📄 FORMAT STRING | | |
|    📄 TERMINATE | RETURN TYPE: | VOID ▾ |

[ OK ] [ CANCEL ]

FIG. 23

CONFIGURE ACTIONS

FUNCTIONS
- DIALOGS
  - CHOOSE
  - DISPLAY MESSAGE
- FIELDS
  - APPEND TO FIELD
  - SET FIELD
- MATH
  - MULTIPLY
- TRANSACTIONS
  - GETCUSTOMERDATA
- REQUIRED FUNCTIONS
  - FLOWCOMPLETE
  - FORMAT STRING
  - TERMINATE

VALUES
- NAME: SET FIELD
- DIAGRAM TEXT: SET FIELD
- CLIPS TEXT: setfield
- PARAMETERS: (COLLECTION)
- CATEGORY: STANDARD
- SUMMARY: NOTES, STATUS, ADDRESS, NA
- SELECTION FACT:
- RETURN TYPE: VOID

[OK] [CANCEL]

FIG. 24

CONFIGURE ACTIONS

```
📁 FUNCTIONS
  ⊟📁 DIALOGS
      📄 CHOOSE
      📄 DISPLAY MESSAGE
  ⊟📁 FIELDS
      📄 APPEND TO FIELD
      📄 SET FIELD
  ⊟📁 MATH
      📄 MULTIPLY
  ⊟📁 TRANSACTIONS
      📄 GETCUSTOMERDATA
  📁 REQUIRED FUNCTIONS
      📄 FLOWCOMPLETE
      📄 FORMAT STRING
      📄 TERMINATE
```

VALUES

| | |
|---|---|
| NAME: | MULTIPLY |
| DIAGRAM TEXT: | MULTIPLY |
| CLIPS TEXT: | multiply |
| PARAMETERS: | (COLLECTION) |
| CATEGORY: | BINARY OPERATOR ⌄ |
| SUMMARY: | |
| SELECTION FACT: | |
| RETURN TYPE: | NUMBER ⌄ |

[ OK ]   [ CANCEL ]

Fig.25

| CONFIGURE ACTIONS | | |
|---|---|---|
| FUNCTIONS | VALUES | |
| 📁 FUNCTIONS | NAME: | GETCUSTOMERDATA |
| 📁 DIALOGS | DIAGRAM TEXT: | GETCUSTOMERDATA |
|    📄 CHOOSE | | |
|    📄 DISPLAY MESSAGE | CLIPS TEXT: | getcustomerdata |
| 📁 FIELDS | PARAMETERS: | (COLLECTION) |
|    📄 APPEND TO FIELD | | |
|    📄 SET FIELD | CATEGORY: | STANDARD ▽ |
| 📁 MATH | SUMMARY: | |
|    📄 MULTIPLY | | |
| 📁 TRANSACTIONS | SELECTION FACT: | |
|    📄 GETCUSTOMERDATA | | |
| 📁 REQUIRED FUNCTIONS | RETURN TYPE: | VOID ▽ |
|    📄 FLOWCOMPLETE | | |
|    📄 FORMAT STRING | | |
|    📄 TERMINATE | | |

[ OK ]   [ CANCEL ]

```
(defrule initial_6
        (APPRAISED VALUE ?appraisedvalue)
        (INCOME ?income)
        ?dd<-(initial "7P1")
=>
        (if(>?appraisedvalue(multiply value1 ?income value2 initial_3))then
        (retract ?dd)
        (appendtofield initial_RFAV fieldname initial_NOTES)
        (setfield initial_REJECT fieldname initial_STATUS)
        (FLOWCOMPLETE)))

(defrule initial_7
        (APPRAISED VALUE ?appraisedvalue)
        (INCOME ?income)
        ?dd <-(initial "7P1")
=>
        (if(not(>?appraisedvalue (multiply value1 ?income value2 initial_3))) then
        (retract ?dd)
        (appendtofield initial_APPROV fieldname initial_NOTES)
        (setfield initial_APPROVE fieldname initial_STATUS)
        (FLOWCOMPLETE)))
```

Fig.35

```
INITIAL_3=3
INITIAL_ADDRES=ADDRESS
INITIAL_APPROV=APROVED
INITIAL_BANKRU=BANKRUPT
INITIAL_NAME=NAME
INITIAL_NOTA=NONE OF THE ABOVE
INITIAL_NOTES=NOTES
INITIAL_REJECT=REJECTED
INITIAL_RFAV=REJECTED FOR APPRAISED VALUE
INITIAL_RFB=REJECTED FOR BANKRUPTSY
INITIAL_RFCS=REJECTED FOR CREDIT SCORE
INITIAL_RFI=REJECTED FOR INCOME
INITIAL_STATUS=STATUS
INITIAL_UNEMPL=UNEMPLOYED
INITIAL_WOTFAT=WHICH OF THE FOLLOWING APPLIES TO YOU?
```

Fig.36

APPARATUS FOR GENERATING SOFTWARE LOGIC RULES BY FLOWCHART DESIGN

PRIORITY CLAIM

The priority benefit of U.S. provisional patent application Ser. No. 60/979,505, filed Oct. 12, 2007, is claimed. Provisional patent application 60/979,505 is hereby incorporated in its entirety by reference.

SUMMARY OF THE INVENTION

According to its major aspects and briefly recited, the present invention is an apparatus implemented using a programmable computer that is used to develop a flow chart of a process and to generate the rules needed by a rules engine to implement that process. In the development of this flow chart, the user makes choices from dialogs that automatically enable the apparatus to produce software logical rules in a computer language. These software rules, which are the logically related steps needed to automate the process, may then be read directly by a rules engine to implement process defined by the flow chart.

An important feature of the present invention is the use of standard flow diagram shapes and connectors not only to design the flow chart but to carry as part of their properties the information that discloses the sequential execution of the process rules. In addition the software developer pre-configures metadata on each function and variable that facilitates rule generation; that is, the metadata identifies (1) the references to which the functions and variables belong, (2) the variable types, (3) the function return types and (4) function parameter types. Turning a flow chart into an automated process currently requires a great deal of custom programming. In contrast, the present apparatus allows a business user to generate the automating rules simply by preparing the flow chart once the developer sets up the developer interface. Furthermore, various flow charts can be designed using the same, preprogrammed developer interface.

An important feature of the invention is the ability of the business user to use the flow diagram to define menus and selections which would be displayed at runtime allowing the runtime user to dictate the direction of the process flow. The shapes and connectors are used in the present invention to define menu functions and selections. These dialog boxes and the values and options within them both assist the user in preparing a complete flow chart but also facilitate the automatic production of the software logic rules because they explicitly define the logic that is inherently made part of a flow chart.

Still another feature of the present invention is the use of common, off-the-shelf software for use in developing the flow chart because the shapes and connectors used in that software are already familiar to flow chart designers. Thus, the present invention takes advantage of the existing familiarity of designers with flow charts.

Similarly, the present invention produces the logical rules in a software form, such as scripts in extensible application markup language (XAML) that is ready for use by rules engines without further processing.

Those familiar with software-controlled processes and its development will appreciate these and other features and their advantages from a careful reading of the Detailed Description of Preferred Embodiments, accompanied by the following drawings.

According to the first embodiment of the present invention, the variables configuration form, the functions configuration form and the parameters configuration form allow the software developer to store metadata about the functions and variables which facilitates the translation of flow diagrams into rules in XAML which will be loaded and executed by the Windows Workflow Foundation (WF) Rules Engine.

According to the second embodiment of the present invention, the variables configuration form, the functions configuration form and the parameters configuration form allow the software developer to store metadata about the functions and variables which facilitate the translation of flow diagrams into rules definitions to be loaded and executed by a Rules Engine which processes rules using the RETE algorithm e.g. The CLIPS Rules Engine or the Microsoft BizTalk Server Rules Engine.

BRIEF DESCRIPTION OF THE DRAWINGS

In the figures,

FIG. 3 presents a screen image of a variables configuration form for storing variables metadata that facilitates translation of the flow diagrams into rules in XAML, according to a first preferred embodiment of the present invention. The EVALUATION TYPE is being set to AUTOMATIC.

FIG. 4 presents a screen image of a variables configuration form for storing variables metadata that facilitates translation of the flow diagrams into rules in XAML, according to a first preferred embodiment of the present invention. The REFERENCE CATEGORY is being set to FIELD.

FIG. 5 presents a screen image of a variables configuration form for storing variables metadata that facilitates translation of the flow diagrams into rules in XAML, according to a first preferred embodiment of the present invention. The VARIABLE CATEGORY is being set to PROPERTY.

FIG. 6 presents a screen image of a functions configuration form for storing functions metadata that facilitates translation of the flow diagrams into rules in XAML, according to a first preferred embodiment of the present invention. The FUNCTION CATEGORY is being set to MULTIPLE CHOICE.

FIG. 7 presents a screen image of a functions configuration form for storing functions metadata that facilitates translation of the flow diagrams into rules in XAML, according to a first preferred embodiment of the present invention. The values reflect metadata for the APPEND TO NOTES function.

FIG. 8 presents a screen image of a functions configuration form for storing functions metadata that facilitates translation of the flow diagrams into rules in XAML, according to a first preferred embodiment of the present invention. The REFERENCE CATEGORY is being set to NONE.

FIG. 9 presents a screen image of a functions configuration form for storing functions metadata that facilitates translation of the flow diagrams into rules in XAML, according to a first preferred embodiment of the present invention. The values reflect metadata for the GET CUSTOMER DATA function.

FIG. 14 presents a screen image of the Conditions Update form which is displayed when the business user edits a Condition Shape in a flow diagram that can be translated into rules in XAML, according to a first preferred embodiment of the present invention. The condition is being defined to evaluate whether of not the appraised value of a house is greater than 3 times the customer's income.

FIG. 17 presents a screen image of a rule definition deserialized from XAML (viewed in a Rule Set Editor from Microsoft) showing the condition where the appraised value is greater than 3 times the borrower's income and the consequent Then Actions.

FIG. 18 presents a screen image of a rule definition deserialized from XAML (viewed in a Rule Set Editor from Microsoft) showing the condition where the appraised value is NOT greater than 3 times the borrower's income and the consequent Then Actions.

FIG. 19 presents a listing of the resource file associated with the initial module.

FIG. 20 presents a screen image of a variables configuration form for storing variables metadata that facilitates translation of the flow diagrams into rules for a rules engine implementing the RETE algorithm, according to a second preferred embodiment of the present invention. The EVALUATION TYPE is being set to VARIABLE FACT.

FIG. 21 presents a screen image of a variables configuration form for storing variables metadata that facilitates translation of the flow diagrams into rules for a rules engine implementing the RETE algorithm, according to a second preferred embodiment of the present invention. The VARIABLE TYPE is being set to NUMBER.

FIG. 22 presents a screen image of a functions configuration form for storing functions metadata that facilitates translation of the flow diagrams into rules for a rules engine implementing the RETE algorithm, according to a second preferred embodiment of the present invention. The values reflect metadata for the CHOOSE function.

FIG. 23 presents a screen image of a functions configuration form for storing functions metadata that facilitates translation of the flow diagrams into rules for a rules engine implementing the RETE algorithm, according to a second preferred embodiment of the present invention. The values reflect metadata for the APPEND TO FIELD function.

FIG. 24 presents a screen image of a functions configuration form for storing functions metadata that facilitates translation of the flow diagrams into rules for a rules engine implementing the RETE algorithm, according to a second preferred embodiment of the present invention. The values reflect metadata for the SET FIELD function.

FIG. 25 presents a screen image of a functions configuration form for storing functions metadata that facilitates translation of the flow diagrams into rules for a rules engine implementing the RETE algorithm, according to a second preferred embodiment of the present invention. The values reflect metadata for the MULTIPLY function.

FIG. 26 presents a screen image of a functions configuration form for storing functions metadata that facilitates translation of the flow diagrams into rules for a rules engine implementing the RETE algorithm, according to a second preferred embodiment of the present invention. The values reflect metadata for the GET CUSTOMER DATA function.

FIG. 32 presents a screen image of the Conditions Update form which is displayed when the business user edits a Condition Shape in a flow diagram that can be translated into rules for a rules engine implementing the RETE algorithm, according to a second preferred embodiment of the present invention. The condition is being defined to evaluate whether of not the appraised value of a house is greater than 3 times the customer's income.

FIG. 35 presents a screen image of two rule definitions in CLIPS, according to a second preferred embodiment of the present invention, the first rule shows the condition where the appraised value is greater than 3 times the borrower's income and the consequent Then Actions and a second rule shows the condition where the appraised value is not greater than 3 times the borrower's income and the consequent Then Actions.

FIG. 36 presents a listing of the resource file associated with the initial module.

DETAILED DESCRIPTION OF PREFERRED EMBODIMENTS

Figure 1:
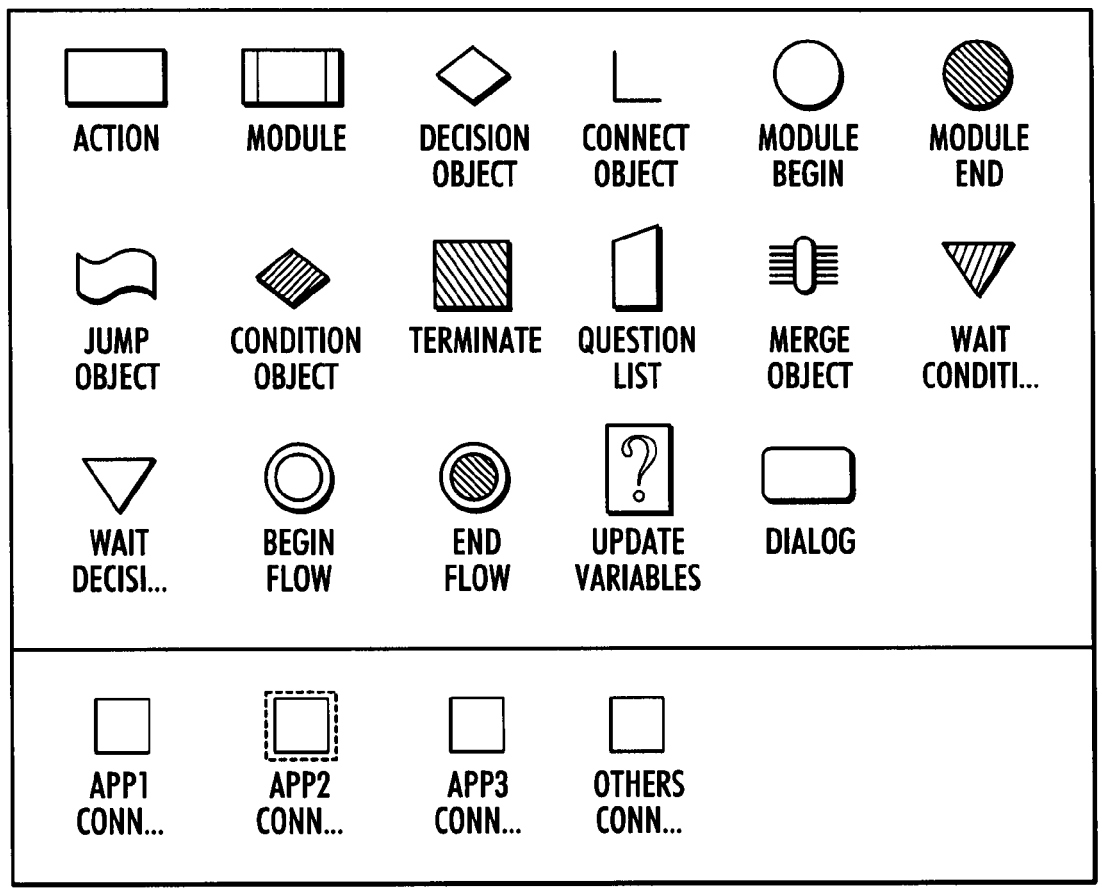
FIG. 1 presents an array of flow chart template shapes for use by a developer in designing a flow chart that generates software rules, according to a preferred embodiment of the present invention.

The present invention is an apparatus implemented on a programmable computer for generating rules acceptable to a rules engine and needed to automate a process. The rules are the steps needed to automate the process and are in a form that the rule engine can implement directly.

The present invention requires object-based programming which is well known to those familiar with current computer software languages. Many of the terms used herein have meanings in the context of object-based programming that are familiar and well-understood by those versed in object-based programming languages.

For example, as used herein, "function" means a method, defined in this case in the rule-driven business application. A "method" is one or more steps taken in sequence or in parallel to achieve a result.

Properties are members of software objects defined by the programmer. They can be read only, write only or read and write. Read only properties have just the "get" functionality implemented. Write only properties have just the "set" functionality implemented. Read and write properties have both "get" and "set" functionalities implemented. A field is a member of a software object which when accessible is always readable and writeable.

Any reputable reference on object-based programming, such as www.cplusplus.com or C, C++, Object Oriented Programming (OOPS) Computer Based Training (CBT) Practical Programming, Data Structures and Algorithms, Version 4.1, by Appln. Also, in particular, terms as used in VISIO, by Microsoft Corporation have the same meanings herein in the first embodiment of the present invention, unless otherwise specified.

The present invention has three main components: a developer interface; an editing interface, and a rules generator. The developer interface enables the user, referred to herein as the developer, of the present software to define functions and variables together with their properties based on the business application or process. The term business application and, alternatively, business process refers to a process that a business entity wishes to automate and it therefore needs a software application that automatically performs the process. Therefore, a business application or business process is the software application that automatically performs the process.

An important part of a business application is a rules engine, which is the part that executes the software rules it is given. In order to perform the process, those rules of that process have to be developed and given to the rules engine in a form it can execute. The term business is, of course, not restricted to for-profit businesses but includes non-profit businesses, government entities, universities, associations and private individuals.

The editing interface allows the business user to define the logical rules the business would follow in performing the business application by creating flow diagrams using the functions and variables defined in the developer interface. The flow diagrams pictorially illustrates the process flow.

The editing interface uses shapes and connectors to depict the process flow. These shapes and connectors are software objects, as in object programming, which is by itself a tool well-known to those familiar with modern software programming. Software objects are defined by their properties. The present invention uses these properties to carry the functions and variables of the process so that the rules generator can retrieve that information and generate the business application rules The rules generator then parses the flow diagrams defined by the business user and, using the functions and variables stored in the shapes by the business user and the functions and variables metadata defined in the developer interface, translates the flow diagram into rules that can be executed by a rules engine. Those rules are generated in a software language such as extensible application markup language (XAML) that is readily interpreted by a rules engine, such as, for example, Windows WF Rules Engine. The rules issued by the rules generator can then be deployed to a business software application with a rules engine that permits the runtime user to execute the process automatically.

An example of a typical business application might be a medical diagnostic application that evaluates automatically whether a patient should receive a prescription for antibiotics based on the patient's medical record information and her answers to a few basic questions ("Do you have a fever?", etc.).

Another example might be in order fulfillment for an online store. Once an order is received from a customer on line, it is turned over to order fulfillment to assure that the goods are shipped to the customer who placed the order. Order fulfillment includes processing payment, shipping the goods and handling backorders.

Still another example of a business process might be processing an application for life insurance on line, including arranging for a physical for the applicant when appropriate given the amount of the insurance, and for underwriting the application.

The present invention would permit any of these, as well as an endless number of other processes to be completely automated much more easily than can be done by traditional custom programming. The present invention requires only the creation of the flow chart to generate the rules in a software code format readily by a rules generator because of the way the flow chart is created.

The following describes in detail the method for implementing the present method using the same example in two ways. The example includes a portion of a flow chart for determining whether an applicant for a mortgage meets one of the conditions, namely, that the borrowed amount be less than three times the applicant's income. The first way describes how rules are created for the Windows WF Rules Engine in XAML. The second way describes how rules for the rules engine implementing the RETE algorithm (e.g. CLIPS Rules Engine) are created.

First Embodiment

Creation of Rules for Windows WF Rules Engine in XAML

1 Abstract

In summary the present invention is defined in three parts:
1) A Developer Interface that performs a mapping of functions, variables and project properties between the present invention and the business application.
2) An Editing Interface that allows the business user to define the rules in the form of flow diagrams and tables using the functions and variables defined in the Developer Interface.
3) The Rules Generator that then parses the flow diagrams and tables defined by the business user and using the functions and variables defined in the Developer Interface, creates rules for the Windows WF Rules Engine in XAML. The rules can then be deployed to a business application that may reside on the same local area network.

2 Developer Interface 2.1 Functions

Functions define the mapping between methods in the Activity Class of the business application and the functions used in present invention to define and generate the rules. The definition includes the following:

Name—name visible to the user

Summary—is used by the developer to describe the function to the business user

Code Name—is the name used in the generated rules.

Function Category—allows for certain special considerations for each function:
  i. Standard—no special considerations
  ii. Dialog—used in the Dialog Shape only
  iii. Multiple Choice—used in the Dialog Shape only and uses the connectors as multiple choice options
  iv. Binary Operator
  v. Set Variable—function used for setting the value of a variable.

Reference Name is used in two cases:
  i. Holds the fully-qualified type name when the function belongs to a type i.e. a static function
  ii. Hold the reference variable name when the function belongs to a class other than the Activity Class i.e. an object referenced by the activity.

Reference Category defines the function's membership as follows:
  i. This—the function is a non-static member of the Activity Class.
  ii. Type—the function is a static member.
  iii. Field—the function is a member of an Activity Class Field Reference.
  iv. Property—the function is a member of an Activity Class Property References.
  v. None—the function is an operator.

Parameters Layout—defines how the parameters are displayed in the editing forms i.e. sequentially or in a binary format separated by the function name.

Return Type—can be Void, Boolean, DateTime, String, Char, Decimal, Single, Double, Byte, Int16, Int32, Int64, SByte, UInt16, UInt32 or UInt64.

Parameters—a list of parameters if necessary.

Each Parameter definition includes the following:
  Name—visible to the user
  Type—can be Boolean, DateTime, String, Char, Decimal, Single, Double, Byte, Int16, Int32, Int64, SByte, UInt16, UInt32, UInt64 or Any. "Any" means the parameter can be any of the other fifteen types.
  Control—defines the type of user control available to the user in edit mode. The control can be a drop down list, a single line text box or a multi line text box.
  Optional—defines whether or not this parameter is optional for this function.
  Domain—defines the list of choices for the parameter. If no choices are listed, then the user is restricted to the type alone.

2.2 Variables

Name—name is visible to the user

Variable Name—name used in the generated rules

Variable Category—indicates whether the variable is a field or a property

Reference Name—used in two cases:
  i. Holds the fully qualified type name when the variable belongs to a type i.e. a static function
  ii. Hold the reference variable name when the variable belongs to a class other than the Activity Class, i.e. an object referenced by the activity.

Reference Category—defines the variable's membership as follows:
  i. This—the variable is a non static member of the Activity Class.
  ii. Type—the variable is a static member.
  iii. Field—the variable is a member of an Activity Class Field Reference.
  iv. Property—the variable is a member of an Activity Class Property References.

Evaluation—can be one of the following:
  i. Implemented—must be implemented by the developer
  ii. Automatic—can be used without implementation Domain—defines the list of choices for the variable. If no choices are listed, then the user is restricted by the type alone.

Variable Type—can be Boolean, DateTime, String, Char, Decimal, Single, Double, Byte, Int16, Int32, Int64, SByte, UInt16, UInt32 or UInt64.

The Comments field—used to describe the variable's purpose.

2.3 Project Properties

Project Properties are defined in terms of applications. An application is representative of a business application. Business applications with very similar business rules can be defined in a single project.

Each application has the following properties defined:
  Name—unique name defined by present invention
  Nickname—unique name defined by the user
  Activity Assembly—name of the assembly with the activity class. The Activity Class is the class whose members can be directly accessed by the executing rules (in C#, this.variableName; or this.methodName( );).
  Activity Assembly Path
  Activity Class
  Executable—executable file name
  Path to the executable
  Startup Arguments—arguments passed to the executable on startup
  Resource file—resource file name
  Resource file deployment path
  Rules file—rules file name
  Rules file deployment path List of excluded modules—by default all modules in the project are included in every application

3 Editing Interface
3.1 Flow Diagrams

A suitable flow diagram developer interface may be Microsoft Visio Drawing Control produced by Microsoft Corporation or equivalent. The business user of the developer interface is restricted to the stencils provided to define the process flow. The shapes include data structures for defining functions, variables, and other data. The Rule generator in turn uses the shapes illustrated in FIG. 1 and the data structures they contain to generate the rules.

- The Action shape contains functions to be executed in the course of the process flow. A single Action shape can contain multiple functions that are invoked in sequence. Functions are methods defined in the business application and are configured through the developer interface. Functions with a Function Category of Multiple Choice or Dialog may not be used in an Action Shape.
- The Dialog shape unlike the Action shape can hold only one function at a time. The function must have a Function Category of Multiple Choice or Dialog.
- The Module shape tells the current module to invoke another existing module. The process flow may end within the called module. If the process does not end within the called module, control returns to the calling module upon completion.
- The Decision shape allows the user to define process flow options based on the variables defined through the developer interface. These variables are properties or fields or belong to a dictionary of values in the business application.
- The Connector shape is used for directing the process flow from one shape to another. Application-specific connector shapes, shown at the bottom of FIG. 1, indicate that the rules generated surrounding that connector should apply only to that specific application.
- The Module Begin shape is the starting point of execution within a module.
- The Module End shape tells the process to return control to the calling module.
- The Begin Flow shape is the initial entry point to the entire process flow.
- The End Flow shape ends execution and calls the Flow Complete function which must be implemented by the business application.
- The Jump shape tells the direction of process flow without using connectors, directing it to continue at another location within the same module. The process flow moves to the only other matching Jump shape in the module from which execution will continue.
- A Condition shape is like the Decision shape but has a little more flexibility. It can be used to compare the values returned by two functions, for example. The Decision shape always evaluates a variable.
- The Terminate shape is a way to stop the process prematurely. A Terminate method must be implemented by the business application.
- The Merge shape allows for a separate set of rules for different applications within the same diagram. Application specific connectors pointing away from the Merge shape define application specific rules. Application specific connectors pointing towards a Merge Shape direct application specific process flows to join a common process flow.
- The Wait Decision shape is like a Decision shape except that it has one exit only. The process flow cannot continue until it evaluates to true. As an example, this can be useful when waiting for a remote process to complete.
- The Wait Condition shape is like a Condition shape except that it has one exit only. The process flow cannot continue until it evaluates to true.
- The Question List allows the business user to define a list of questions that will dictate the direction of the flow at run time. Each Yes or No response to a question can be assigned a set of variable and value pairs. The runtime user's response then determines whether or not a value is assigned to a variable. In this way the process flow can progress differently depending on the runtime user's responses.
- The Update Variables shape allows the business user to specify a set of variables that can be updated by the runtime user. Only variables configured with an evaluation type of Automatic can be specified.

3.1.1 Shape Data Structures

The shape data have well-defined hierarchical data structures and are stored in the shapes' custom properties.

3.1.1.1 Action Shape

The Action shape includes one or more functions with Function Categories of Standard or Set Variable. The Standard Category structure contains a function name and a set of parameters. Each parameter can have another function or a variable as part of its value. The Set Variable Category structure contains a variable and a value for the variable.

3.1.1.2 Dialog Shape

The Dialog shape includes one function with Function Category of Multiple Choice or Dialog. The data structures contain a function name and a set of parameters. Each parameter can have another function or a variable as part of its value.

3.1.1.3 Condition Shape

The Condition shape's data structure is built on functions with a Boolean return type. It holds a single Boolean function at its root. The Or, And or Not functions are predicated on inner functions in the data structure.

3.1.1.4 Decision Shape

The Decision shape's data structure holds a single variable at its root or a single Or, And or Not function. Or, And or Not, functions are predicated on inner variables. Each variable in turn is predicated on a Boolean function.

3.1.1.5 Wait Condition Shape

The Wait Condition shape's data structure is identical to the Condition shape's data structure.

3.1.1.6 Wait Decision Shape

The Wait Decision shape's data structure is identical to the Decision shape's data structure.

3.1.1.7 Question List Shape

The Question List shape's data structure has multiple questions and folders at its root. Each question has a text property, an identification property, a set of variable-and-value pairs to be assigned when the runtime user answers "Yes" to a question, and a set of variable-and-value pairs to be assigned when the runtime user answers "No" to a question. Each folder can have multiple questions.

3.1.1.8 Update Variables Shape

The Update Variables shape's data structure contains a list of variables.

3.1.1.9 Generic Shape

The generic shape data structure includes a name property and a value property.

3.1.1.10 Module Shape

The Module shape's data structure has the generic shape data structure. Its name property identifies the data as a Module shape data and the value field holds the module name.

3.1.1.11 Jump Shape

The Jump shape's data structure has the generic shape data structure. Its name property identifies the data as a Jump shape data and the value field holds the unique jump pair identifier.

3.1.1.12 Connector Shape

The Connector shape's data structure includes three properties. The first is an index property that distinguishes each connector from the other connectors leaving a shape. The second is its category. The category indicates whether the connector is leaving a Dialog shape on one hand or a Condition or Decision shape on the other hand. Third, the text property holds the connector's text value. This value is always Yes/No for Condition or Decision Connectors. For Dialog Connectors the value is defined by the business user.

3.2 Tables

The Table Interface is a data grid with three columns: Condition, Action and Priority.

The Condition column allows the user to set conditions based on the variables and Boolean functions defined in the developer interface, which, when satisfied, executes the corresponding action. These functions are methods in the business application. The variables are properties or fields in the business application or belong to a dictionary of values in the business application.

The Action column contains functions to be executed whenever the specified conditions are satisfied. Functions are methods defined in the business application and the developer interface.

The Priority column allows the user to set the priority of execution of the rule relative to other activated rules.

3.2.1 Table Cell Data Structures

The cells' data adhere to well-defined hierarchical data structures and are stored in adjacent hidden cells.

3.2.1.1 Condition Cell

The Condition cell's data structure is built on functions with a Boolean return type. It holds a single Boolean function at its root. Or, And, and Not, functions are predicated on inner functions in the data structure.

3.2.1.2 Action Cell

The Action cell includes one or more functions. There are two function types: Standard and Set Variable.

A Standard function is a structure containing a name and a set of parameters. Each parameter can have another function or a variable as part of its value. No functions of the Multiple Choice or Dialog Categories are allowed in an Action cell.

A Set Variable function includes a variable and a value for the variable.

3.2.1.3 Priority Cell

The Priority cell's data structure has the generic shape data structure. Its name property identifies the data as priority data and the value field holds the priority of the rule.

4 Rules Generator

4.1 Flow Diagram

For logic defined in the flow diagram, rules are generated based on the shapes and the data stored within them.

Figure 2:
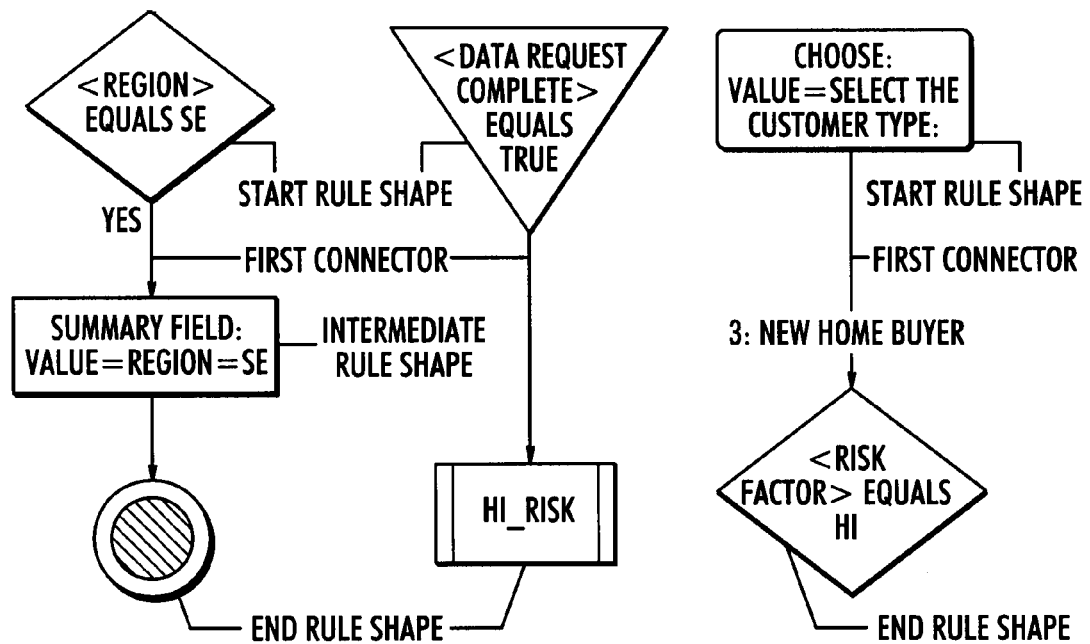
FIG. 2 presents samples of shape sets that each map to one software rule as might be prepared by a developer using the present invention.

An Initial Module shape is one of the initial shapes in the flow diagram i.e. the Module Begin shape or the Begin Flow shape. Sample shape sets are shown in FIG. 2

An End Module shape is any of the shapes at the tail end of the flow diagram i.e. the End shape, the End Flow shape or the Terminate shape.

The generator starts with the Initial Module shape and using the connectors, walks through the entire flow diagram ending with one of the End Module shapes. The generator builds the rules as it traverses the shapes.

Each rule is based on one set of n non-connector shapes and n-1 connectors, where n is greater than 1. The exception is the Question List shape where multiple rules are created.

A Start Rule shape is the first item in a set of shapes that each defines a rule and can be one of the following: Module Begin shape, Begin Flow shape, Dialog shape, Condition shape, Decision shape, Module shape, Merge shape, Wait Condition shape, Wait Decision shape or Question List shape.

An Intermediate Rule shape neither starts nor ends a rule and can only be an Action shape.

An End Rule shape can be one of the following: Module End shape, End Flow shape, Dialog shape, Condition shape, Decision shape, Module shape, Merge shape, Wait Condition shape, Wait Decision shape or Question List shape.

The End Rule shape for one rule is the Begin Rule shape for the next rule except when it is also an End Module shape. This allows the rules to be activated in sequence as dictated by the flow diagram.

A Subsequent shape is an Intermediate Rule shape or an End Rule shape.

The Jump shape does not fit into any of the four categories. It only serves to connect shapes on different pages or different ends of a page i.e. it serves the purpose of connecting two shapes that would be joined by a connector when in closer proximity.

4.1.1 Conditions

The Driver property is a condition based on the Shape Index and Page Index. Its value is set by the current rule using the Shape Index and Page Index with respect to the End Rule Shape. This Driver property then becomes a condition of the new rule.

The Selection property is a condition based on the first connector's value property. When a multiple choice function is invoked, the business application must set the value of the Selection property as indicated by the runtime user's selection.

The Module Begin property refers to the current module. Its value is set when:

The calling module encounters a Module shape.

The current module encounters a Module End shape. In this case the Module Begin property is reset to the name of the calling module.

The business application invokes the initial module.

The Module End property refers to the module that has just completed. This value is set when the completing module encounters a Module End shape.

Page Index is a unique index of a page in a document.

Shape Index is a unique index of a shape on a page.

For Decision, Condition, Wait Condition and Wait Decision Shapes, data conditions are defined by the variables in the data structure, the functions they are predicated on and the connector involved. A rule built around the NO Connector will contain an opposite set of conditions to the rule built for the YES Connector of the same Decision or Condition shape. Wait Condition and Wait Decision shapes have only a single blank connector leaving the shape. Their rules are identical to those built around the YES Connector leaving the Condition and Decision shapes, respectively.

4.1.2 Building the Rules

A rule is based on Conditions and Actions.

All Conditions must be met before the rule executes.

An Action executes if all the Conditions on which it is predicated are met. Conditions are built by considering the Start Rule shape, its data and the first connector.

Actions are built by considering all the shapes and the first connector.

4.1.3 Start Rule Shape
4.1.3.1 Start Rule Shape is Dialog Shape, Multiple Choice Function
    Add the Driver property to the Conditions basing its value on the Shape Index and Page Index.
    Add the Selection property to the Conditions, basing its value on the first connector's text.
    Build an assignment statement for the Selection property resetting its value to an empty string. Add the assignment statement to the Actions for this rule.
4.1.3.2 Start Rule Shape is Dialog Shape, Dialog Function
    Add the Driver property to the Conditions basing its value on the Shape Index and Page Index.
    Add the Dialog Closed property to the Conditions and set its value to true.
    Build an assignment statement for the Dialog Closed property setting its value to false. Add the assignment statement to the Actions for this rule.
4.1.3.3 Start Rule Shape is Begin Flow Shape
    Add the Driver property to the Conditions and set its value to the empty string.
4.1.3.4 Start Rule Shape is Condition Shape
4.1.3.4.1 Condition Shape, Single Predicate, YES Connector
    Add the Driver property as a Condition basing its value on the Shape Index and Page Index
    Build the Boolean function for the predicate.
    Add the Boolean function to the Conditions
4.1.3.4.2 Condition Shape, Single Predicate, NO Connector
    Add the Driver property as a Condition basing its value on the Shape Index and Page Index
    Build the Boolean function for the predicate.
    Build the opposite of Boolean function (i.e. such that predicate equals false) and add it to the Conditions
4.1.3.4.3 Condition Shape, Multiple Predicates, OR Operator, YES Connector
    Create a single rule for all predicates.
    Add the Driver property as a condition basing its value on the Shape Index and Page Index
    For each predicate build the Boolean function for the predicate.
    Perform a Boolean OR across all the Boolean functions and add the result to the conditions
4.1.3.4.4 Condition Shape, Multiple Predicates, OR Operator, NO Connector
    Create a single rule for all predicates.
    Add the Driver property as a Condition basing its value on the Shape Index and Page Index
    For each predicate build the Boolean function for the predicate.
    Perform a Boolean OR across all the Boolean functions, build the opposite of the result (i.e. such that result equals false) and add it to the conditions.
4.1.3.4.5 Condition Shape, Multiple Predicates, AND Operator, YES Connector
    Create a single rule for all predicates.
    Add the Driver property as a condition basing its value on the Shape Index and Page Index
    For each predicate build the Boolean function for the predicate.
    Perform a Boolean AND across all the Boolean functions and add the result to the conditions
4.1.3.4.6 Condition Shape, Multiple Predicates, AND Operator, NO Connector
    Create a single rule for all predicates.
    Add the Driver property as a condition basing its value on the Shape Index and Page Index
    For each predicate build the Boolean function for the predicate.
    Perform a Boolean AND across all the Boolean functions, build the opposite of the result (i.e. such that result equals false) and add it to the conditions
4.1.3.5 Start Rule Shape is Decision Shape
4.1.3.5.1 Decision Shape, Single Predicate, YES Connector
    Add the Driver property as a condition basing its value on the Shape Index and Page Index
    Build the Boolean function for the predicate.
    Add the Boolean function to the conditions
4.1.3.5.2 Decision Shape, Single Predicate, NO Connector
    Add the Driver property as a condition basing its value on the Shape Index and Page Index
    Build the Boolean function for the predicate.
    Build the opposite of Boolean function (i.e. such that predicate equals false) and add it to the conditions.
4.1.3.5.3 Decision Shape, Multiple Predicates, OR Operator, YES Connector
    Create a single rule for all predicates.
    Add the Driver property as a condition basing its value on the Shape Index and Page Index.
    For each predicate build the Boolean function.
    Perform a Boolean OR across all the Boolean functions and add the result to the conditions.
4.1.3.5.4 Decision Shape, Multiple Predicates, OR Operator, NO Connector
    Create a single rule for all predicates.
    Add the Driver property as a condition basing its value on the Shape Index and Page Index.
    For each predicate build the Boolean function for the predicate.
    Perform a Boolean OR across all the Boolean functions, build the opposite of the result (i.e. such that result equals false) and add it to the conditions.
4.1.3.5.5 Decision Shape, Multiple Predicates, AND Operator, YES Connector
    Create a single rule for all predicates.
    Add the Driver property as a condition basing its value on the Shape Index and Page Index.
    For each predicate build the Boolean function for the predicate.
    Perform a Boolean AND across all the Boolean functions and add the result to the conditions.
4.1.3.5.6 Decision Shape, Multiple Predicates, AND Operator, NO Connector
    Create a single rule for all predicates.
    Add the Driver property as a condition basing its value on the Shape Index and Page Index.
    For each predicate build the Boolean function for the predicate.
    Perform a Boolean AND across all the Boolean functions, build the opposite of the result (i.e. such that result equals false) and add it to the conditions.
4.1.3.6 Start Rule Shape is Merge Shape
    Add the Driver property as a condition basing its value on the Shape Index and Page Index.
4.1.3.7 Start Rule Shape is Module Begin Shape
    Add a Driver property to the conditions and set its value to the empty string.
    Add the Module Begin property to the conditions and set its value equal to the module name.
4.1.3.8 Start Rule Shape is Module Shape
    Add the Driver property to the conditions basing its value on the module name, Shape Index and Page Index.

Add the Module End property to the conditions and set its value to the external module name (i.e. the name in the module shape).

4.1.3.9 Start Rule Shape is Question List Shape

Build a Questions rule to display the questions to the user

For each question:

Build one rule for each answer to the question. In the rule, assign values to variables for each variable/value pair that applies to this answer.

Build a Proceed rule which executes after all Answer rules have executed. The Proceed rule has a lower priority than the Answer rules.

4.1.3.9.1 Question List Shape—Questions Rule

Create six lists of equal length.

An item in List1 contains the text associated with a question or folder.

An item in List2 is a list of answers (usually Yes and No) to the question. When the item in List1 is a folder, this list is empty.

An item in List3 contains the unique question or folder identification.

An item in List4 contains a node type indicator, 0 represents a question and 1 represents a folder.

An item in List5 contains the unique identification of the parent folder of the corresponding question or folder form List1. If the question is at the root, it has no parent and the value in List4 will be null.

An item in List6 is a list of other arguments related to the corresponding question or folder form List1.

Add a seventh list (List7) of arguments that can be used at the function level, i.e. the items in this list are not related to individual questions or folders.

Add a Driver property to the conditions basing its value on the Shape Index and Page Index.

Add the Dialog Closed property to the conditions and set its value to false.

Add an invocation of the Build Question function method to the Actions. Pass List1, List2, List3, List4, List5, List6 and List7 as parameters to the Build Question Function method. The Build Question Function must be implemented by the business application.

4.1.3.9.2 Question List Shape—Answer Rules

For each rule add a Driver property to the Conditions basing its value on the Shape Index and Page Index.

For each rule add the Dialog Closed property to the conditions and set its value to true.

For each rule add a Boolean function to the conditions to determine whether the user selected the answer corresponding to this rule. The Boolean function must take the question identification and the answer identification as parameters and must be implemented by the business application.

For each rule, for each variable and value pair assigned to the answer (corresponding to this rule), build a statement setting the variable equal to the value. Add each statement to the Actions for the rule.

4.1.3.9.3 Question List Shape—Proceed Rule

Add a Driver property to the conditions basing its value on the Shape Index and Page Index.

Add the Dialog Closed property to the conditions and set its value to true.

Build a statement that sets the Dialog Closed property to false. Add the statement to the Actions for this rule.

Build a method that clears the memory buffer of the answers selected for each question. Add the method to the Actions for this rule.

4.1.3.10 Start Rule Shape is Update Variables Shape

Build an Update rule to display the Variables Update Form to the user

Build a Proceed rule which executes after the user indicates updates are complete.

4.1.3.10.1 Update Variables Shape—Update Rule

Create two lists of equal length.

An item in List1 contains the variable Name.

An item in List2 contains the Type Name of the corresponding variable in List1.

Add a Driver property to the conditions basing its value on the Shape Index and Page Index.

Add the Dialog Closed property to the conditions and set its value to false.

Add an invocation of the Build Update Variables function method to the Actions. Pass List1 and List2 as parameters to the Build Update Variables Function method. The Build Update Variables function must be implemented by the business application.

4.1.3.10.2 Update Variables List Shape—Proceed Rule

Add a Driver property to the conditions basing its value on the Shape Index and Page Index.

Add the Dialog Closed property to the conditions and set its value to true.

Build a statement that sets the Dialog Closed property to false. Add the statement to the Actions for this rule.

4.1.3.11 Start Rule Shape is Wait Condition Shape 4.1.3.11.1 Wait Condition Shape, Single Predicate Add the Driver property as a condition basing its value on the Shape Index and Page Index.

Build the Boolean function for the predicate.

Add the Boolean function to the conditions.

4.1.3.11.2 Wait Condition Shape, Multiple Predicates, OR Operator

Create a single rule for all predicates.

Add the Driver property as a LHS condition basing its value on the Shape Index and Page Index.

For each predicate build the Boolean function for the predicate.

Perform a Boolean OR across all the Boolean functions and add the result to the conditions.

4.1.3.11.3 Wait Condition Shape, Multiple Predicates, AND Operator

Create a single rule for all predicates.

Add the Driver property as a condition basing its value on the Shape Index and Page Index.

For each predicate build the Boolean function for the predicate.

Perform a Boolean AND across all the Boolean functions and add the result to the conditions.

4.1.3.12 Start Rule Shape is Wait Decision Shape 4.1.3.12.1 Wait Decision Shape, Single Predicate Add the Driver property as a condition basing its value on the Shape Index and Page Index.

Build the Boolean function for the predicate.

Add the Boolean function to the conditions.

4.1.3.12.2 Wait Decision Shape, Multiple Predicates, OR Operator

Create a single rule for all predicates.

Add the Driver property as a condition basing its value on the Shape Index and Page Index.

For each predicate build the Boolean function for the predicate.

Perform a Boolean OR across all the Boolean functions and add the result to the conditions.

4.1.3.12.3 Wait Decision Shape, Multiple Predicates, AND Operator
Create a single rule for all predicates.
Add the Driver property as a condition basing its value on the Shape Index and Page Index.
For each predicate build the Boolean function for the predicate.
Perform a Boolean AND across all the Boolean functions and add the result to the conditions.

4.1.4 Subsequent Shape
The following specifications update the rule defined by the Start Rule shape. If the Start Rule shape is a Question List shape then the specifications update the Proceed rule only.

4.1.4.1 Subsequent Shape is Condition, Decision, Wait Condition, Wait Decision, Question List or Merge shape
Build an assignment statement for the Driver property basing its value on the Shape Index and Page Index. Add the assignment statement to the Actions for this rule.

4.1.4.2 Subsequent Shape is Module Shape
Build an assignment statement for the Driver property basing its value on the Shape Index and Page Index. Add the assignment statement to the Actions for this rule.
Build an assignment statement for the Module Begin property setting its value to the external module name (i.e. the name in the module shape). Add the assignment statement to the Actions for this rule.

4.1.4.3 Subsequent Shape is Action Shape
For each function in the data structure, get the defined parameters and build the function. Add each function to the Actions for this rule.

4.1.4.4 Subsequent Shape is Dialog Shape
Get the function and its defined parameters from the data structure and build the function. Add the function to the Actions for this rule.
Build an assignment statement for the Driver property basing its value on the Shape Index and Page Index. Add the assignment statement to the Actions for this rule.

4.1.4.5 Subsequent Shape is End Flow Shape
Build the End Flow function and add it to the Actions for this rule.

4.1.4.6 Subsequent Shape is Terminate Shape
Build the Terminate function and add it to the Actions for this rule.

4.1.4.7 Subsequent Shape is Module End Shape
Build an assignment statement for the Module End property setting its value to the current module name. Add the assignment statement to the Actions for this rule.

4.2 Tables
For table defined logic, the rules are generated based on the cells and the data stored within them.

4.2.1 Conditions
The Module Begin property is a condition based on the current module or an external module being invoked.
For the Condition cell, data conditions are defined by the variables in the data structure and the functions they are predicated on.

4.2.2 Building the Rules
A rule is based on Conditions and Actions.
All Conditions must be met before the rule executes.
An Action executes if all the conditions on which it is predicated are met.
Conditions are built by considering the data in the Condition cell.
Actions are built by considering the data in the Action cell.

4.2.3 Condition Cell
4.2.3.1 Condition Cell, Single Predicate
Add the Module Begin property to the conditions and set its value to the module name.
Build the Boolean function for the predicate.
Add the Boolean function to the conditions.

4.2.3.2 Condition Cell, Multiple Predicates, OR Operator
Create a single rule for all predicates.
Add the Module Begin Property to the Conditions and set its value to the module name.
For each predicate build the Boolean function for the predicate.
Perform a Boolean OR across all the Boolean functions and add the result to the Conditions.

4.2.3.3 Condition Cell, Multiple Predicates, AND Operator
Create a single rule for all predicates.
Add the Module Begin property to the Conditions and set its value to the module name.
For each predicate build the Boolean function for the predicate.
Perform a Boolean AND across all the Boolean functions and add the result to the Conditions.

4.2.4 Action Cell
The following specification updates the rule defined by the Condition cell.
For each function in the data structure, get the defined parameters and build the function. Add each function to the Actions for this rule.

FIGS. 3-19 illustrate an example of the foregoing process, namely, the set up of a process flow diagram for a portion of a mortgage loan approval business application with one of the conditions for approving the loan being that the appraised value of the property be three times the borrower's income. This sequence of figures shows how a developer configures the functions and variables used in defining the logic underpinning the business process to be automated. After configuring the functions and variables, the business user can then define the logic of the process flow diagram and generate the software rules in a format acceptable and readable by a rules engine.

FIG. 3 presents a screen image of a variables configuration form for storing variables metadata that facilitates translation of the flow diagrams into rules in XAML, according to a first preferred embodiment of the present invention, showing selection of AUTOMATIC as a value for the EVALUATION TYPE and APPRAISED VALUE as the NAME and with DECIMAL as the VARIABLE TYPE and SINGLE LINE TEXT BOX as the CONTROL.

The variables configured in this example, which is part of the mortgage approval process, include the address, appraised value, credit score, income, customer name, address field, name field, status and notes, as shown in FIG. 4. Each variable can have an evaluation type or value of IMPLEMENTED or AUTOMATIC. For example, Appraised Value, Credit Score and Income are of the evaluation type AUTOMATIC and do not have to be implemented in the source code. An Implemented variable is defined by its Reference Category with respect to the Activity Class and its Variable Category.

The Variable Category is FIELD or PROPERTY depending on whether the variable is a field or property of the reference. A Reference Category for a variable can be THIS, TYPE, PROPERTY or FIELD.

A THIS Reference Category is a field or property of the Activity Class itself. A TYPE Reference Category is a reference to a static field or property. A PROPERTY Reference Category as the name suggests means that the reference is a property of the Activity Class. A FIELD Reference Category is a field of the Activity Class.

FIG. 4 presents a screen image of a variables configuration form for storing variables metadata that facilitates translation of the flow diagrams into rules in XAML, according to a first preferred embodiment of the present invention, showing selection of FIELD as a value for the REFERENCE CATEGORY when configuring variables.

FIG. 5 presents a screen image of a variables configuration form for storing variables metadata that facilitates translation of the flow diagrams into rules in XAML, according to a first preferred embodiment of the present invention, showing selection of PROPERTY as a value for the VARIABLE CATEGORY when configuring variables.

A function is defined by its Reference Category with respect to the Activity Class and its Function Category. The Function Category can be STANDARD, DIALOG FORM, MULTIPLE CHOICE or BINARY OPERATOR.

FIG. 6 presents a screen image of a functions configuration form for storing functions metadata that facilitates translation of the flow diagrams into rules in XAML, according to a first preferred embodiment of the present invention, showing selection of MULTIPLE CHOICE when selecting a value for the FUNCTION CATEGORY when configuring variables.

The Function Category DIALOG FORM can only be used with the dialog shape and will invoke a dialog with a single exit, i.e., the user clicks "OK" to continue. The Function Category MULTIPLE CHOICE, like the Category DIALOG FORM, can only be used in a dialog shape but has options defined by the connectors pointing away from the dialog shape.

The Function Category BINARY OPERATOR is an operator, usually a mathematical function such as addition or multiplication. All other Function Categories are STANDARD.

Some functions require parameters to be configured; e.g., the APPEND TO NOTES function takes a value parameter and is configured as shown in FIG. 7.

A Reference Category for a function can be THIS, TYPE, PROPERTY, FIELD or NAME. A THIS Reference Category is a field or property of the Activity Class itself. A TYPE Reference Category is a reference to a static field or property. A PROPERTY Reference Category as the name suggests means that the reference is a property of the Activity Class. Finally, a NONE Reference Class applies to Binary Operators.

FIG. 8 presents a screen image of a functions configuration form for storing functions metadata that facilitates translation of the flow diagrams into rules in XAML, according to a first preferred embodiment of the present invention, showing selection of NONE when selecting the value for the REFERENCE CATEGORY when configuring functions.

FIG. 9 presents a screen image of a functions configuration form for storing functions metadata that facilitates translation of the flow diagrams into rules in XAML, according to a first preferred embodiment of the present invention. The values reflect metadata for the GET CUSTOMER DATA function.

Figure 10:
FIG. 10 presents a screen image of a parameters configuration form for storing a function's parameters metadata that facilitates translation of the flow diagrams into rules in XAML, according to a first preferred embodiment of the present invention. The values reflect metadata for the APPEND TO NOTES function's VALUE parameter.

FIG. 10 presents a screen image of a parameters configuration form for storing a function's parameters metadata that facilitates translation of the flow diagrams into rules in XAML, according to a first preferred embodiment of the present invention. The values reflect metadata for the APPEND TO NOTES function's VALUE parameter.

Figure 11:
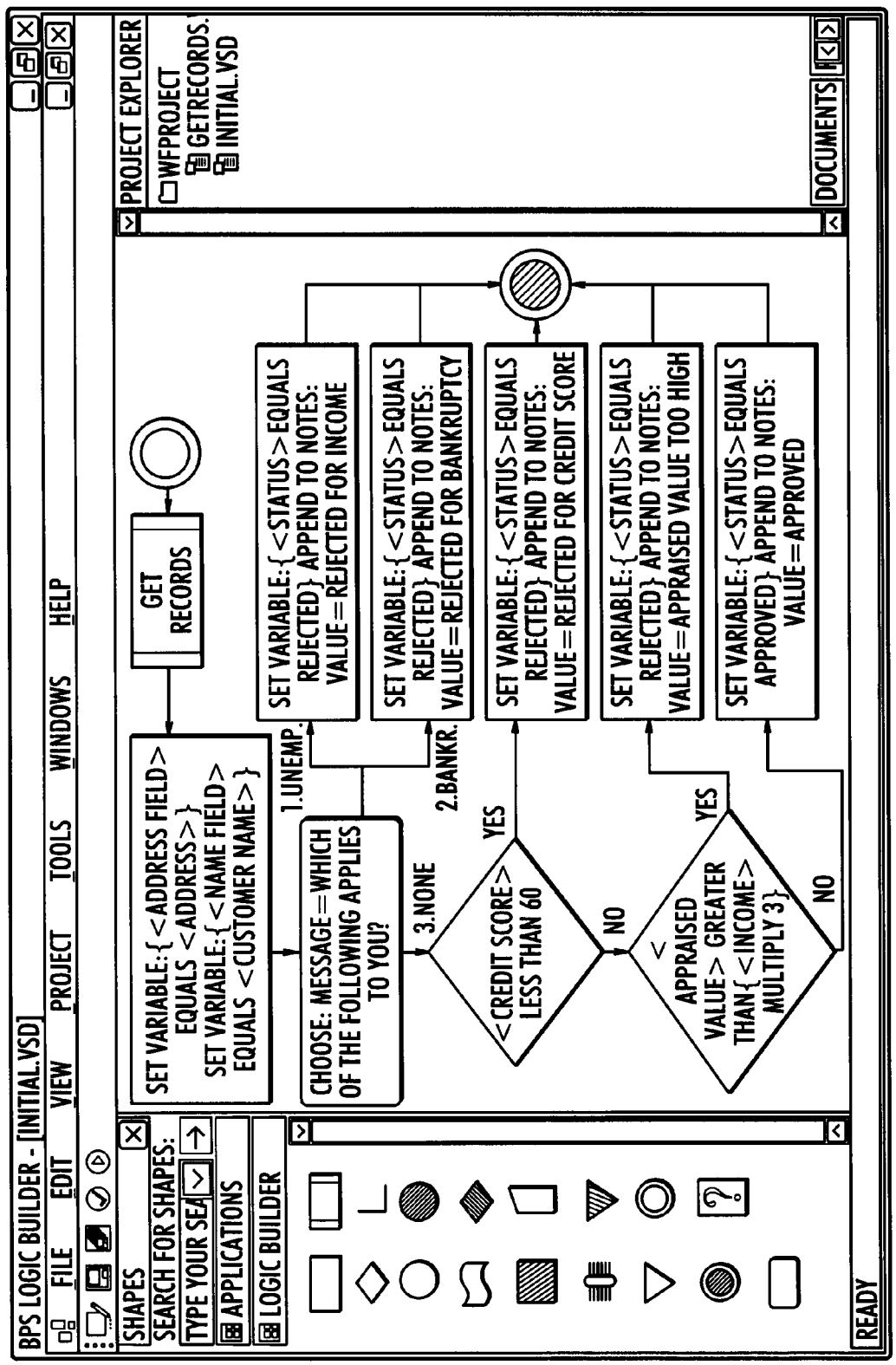
FIG. 11 presents a screen image of a flow diagram that can be translated into rules in XAML, according to a first preferred embodiment of the present invention. The diagram defines the logic for underwriting a loan.

FIG. 11 presents a screen image of a flow diagram that can be translated into rules in XAML, according to a first preferred embodiment of the present invention. The diagram defines the logic for underwriting a loan.

Figure 12:
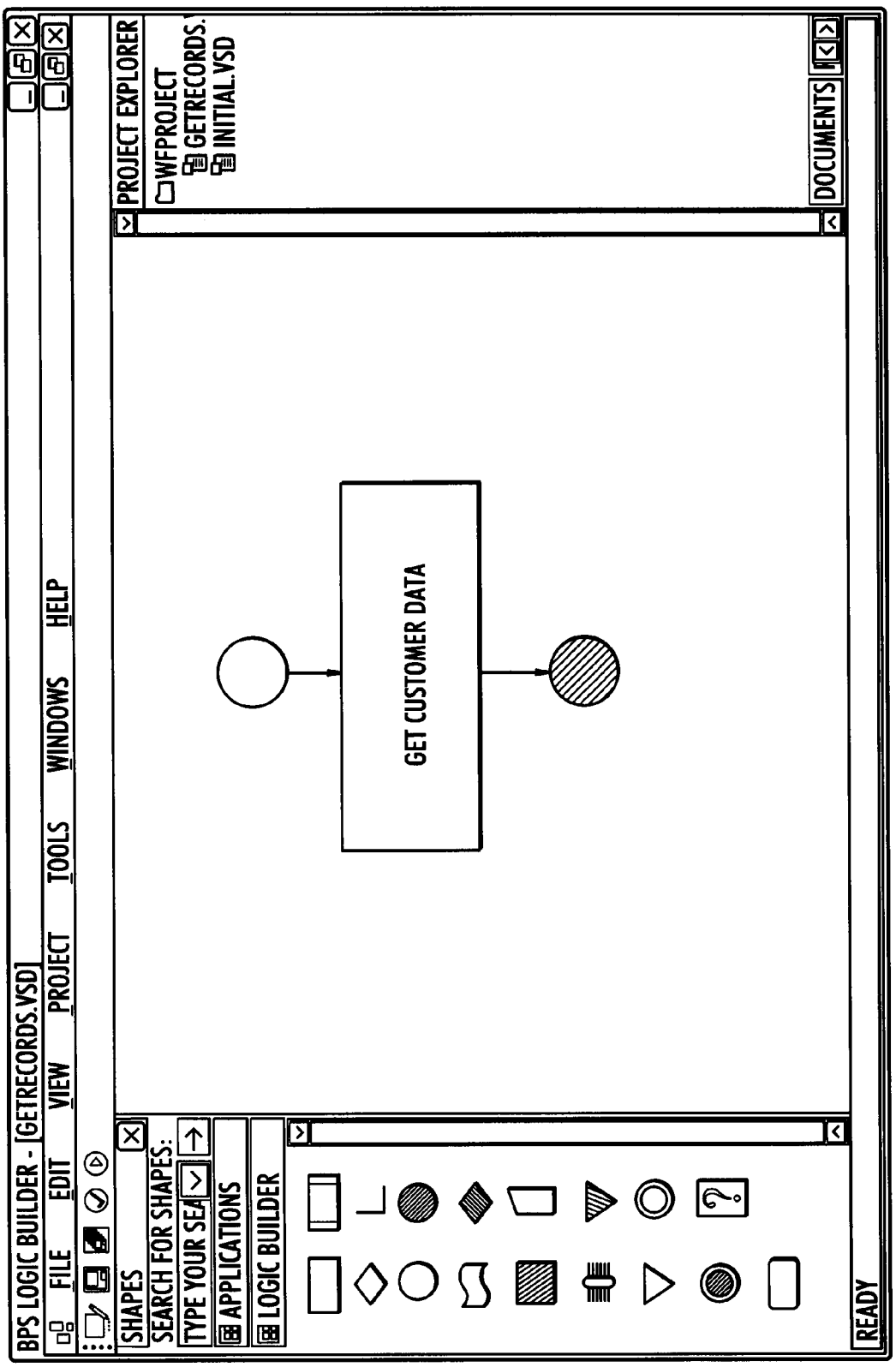
FIG. 12 presents a screen image of a flow diagram that can be translated into rules in XAML, according to a first preferred embodiment of the present invention. The diagram represents a module invoked from the FIG. 11 diagram. Here the customers account data is retrieved.

FIG. 12 presents a screen image of a flow diagram that can be translated into rules in XAML, according to a first preferred embodiment of the present invention. The diagram represents a module invoked from the FIG. 11 diagram. Here the customers account data is retrieved.

Figure 13:
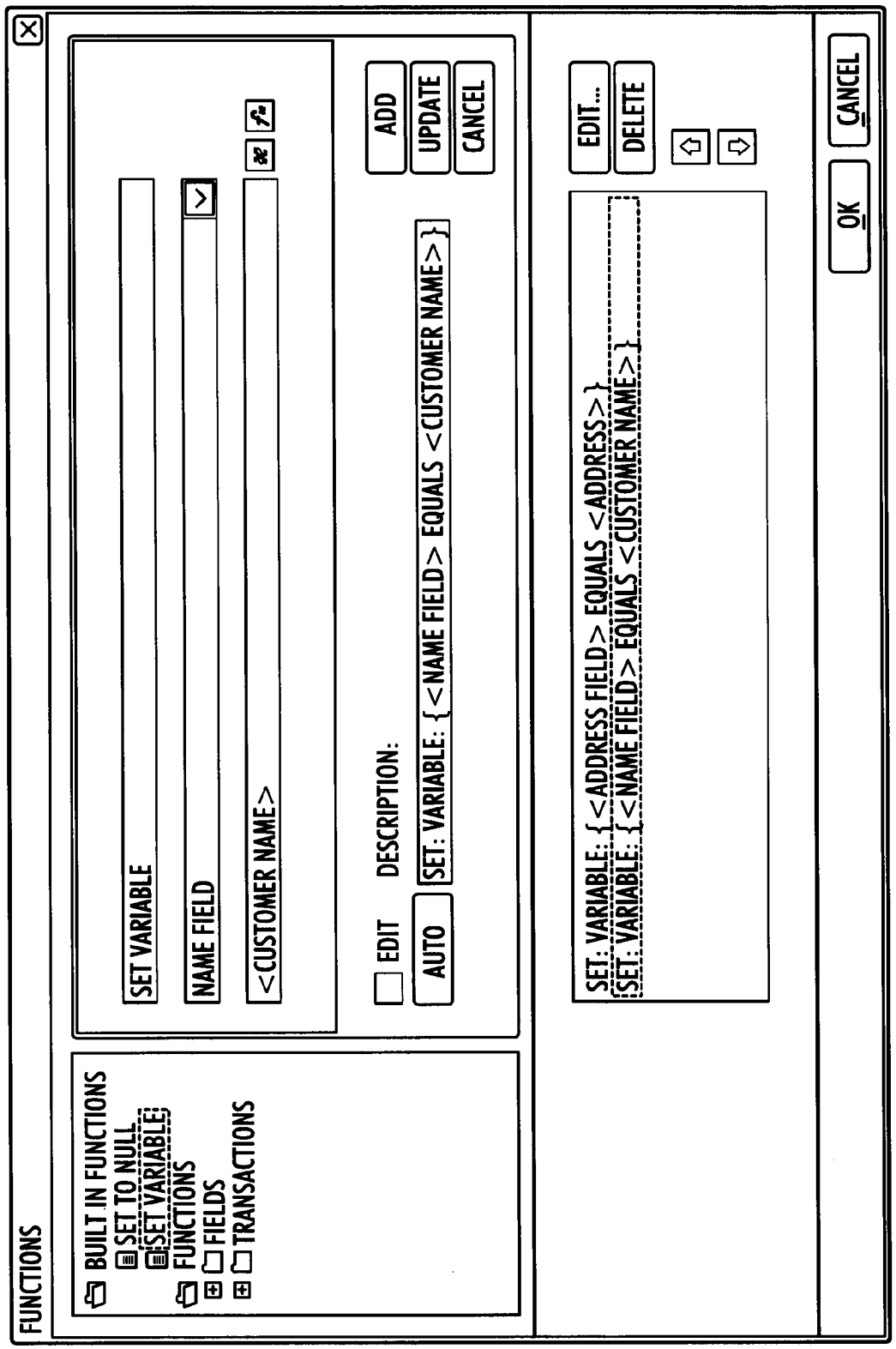
FIG. 13 presents a screen image of the Functions Update form which is displayed when the business user edits an Action Shape or a Dialog Shape in a flow diagram that can be translated into rules in XAML, according to a first preferred embodiment of the present invention. The value of the variable representing the Name Field is being set to the value of the Customer Name variable.

FIG. 13 presents a screen image of the Functions Update form which is displayed when the business user edits an Action Shape or a Dialog Shape in a flow diagram that can be translated into rules in XAML, according to a first preferred embodiment of the present invention. The value of the variable representing the Name Field is being set to the value of the Customer Name variable The SET VARIABLE function is predefined and does not have to be configured by the developer.

The next example shows how to create a condition that determines whether the appraised value of a house is greater than three times the borrower's income. To display the CONDITIONS form, double-click on the Conditions shape and another dialog box opens as shown in FIG. 14.

Figure 14:
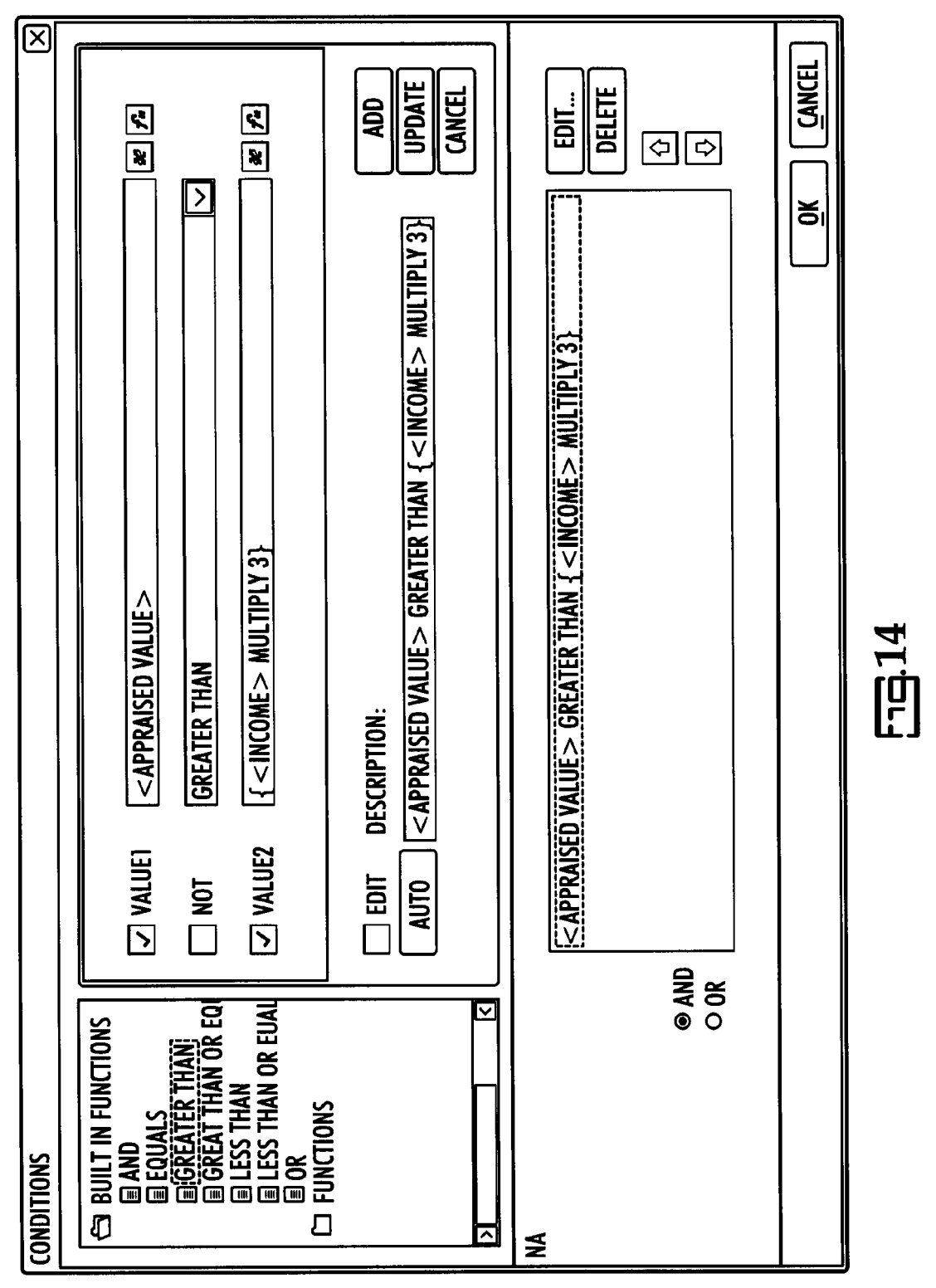

FIG. 14 presents a screen image of the Conditions Update form which is displayed when the business user edits a Condition Shape in a flow diagram that can be translated into rules in XAML, according to a first preferred embodiment of the present invention. The condition being defined evaluates whether of not the appraised value of a house is greater than 3 times the customer's income. To populate the first field, click on the VARIABLE button to display the SELECT VARIABLE dialog and then select APPRAISED VALUE, shown in FIG. 15.

Figure 15:
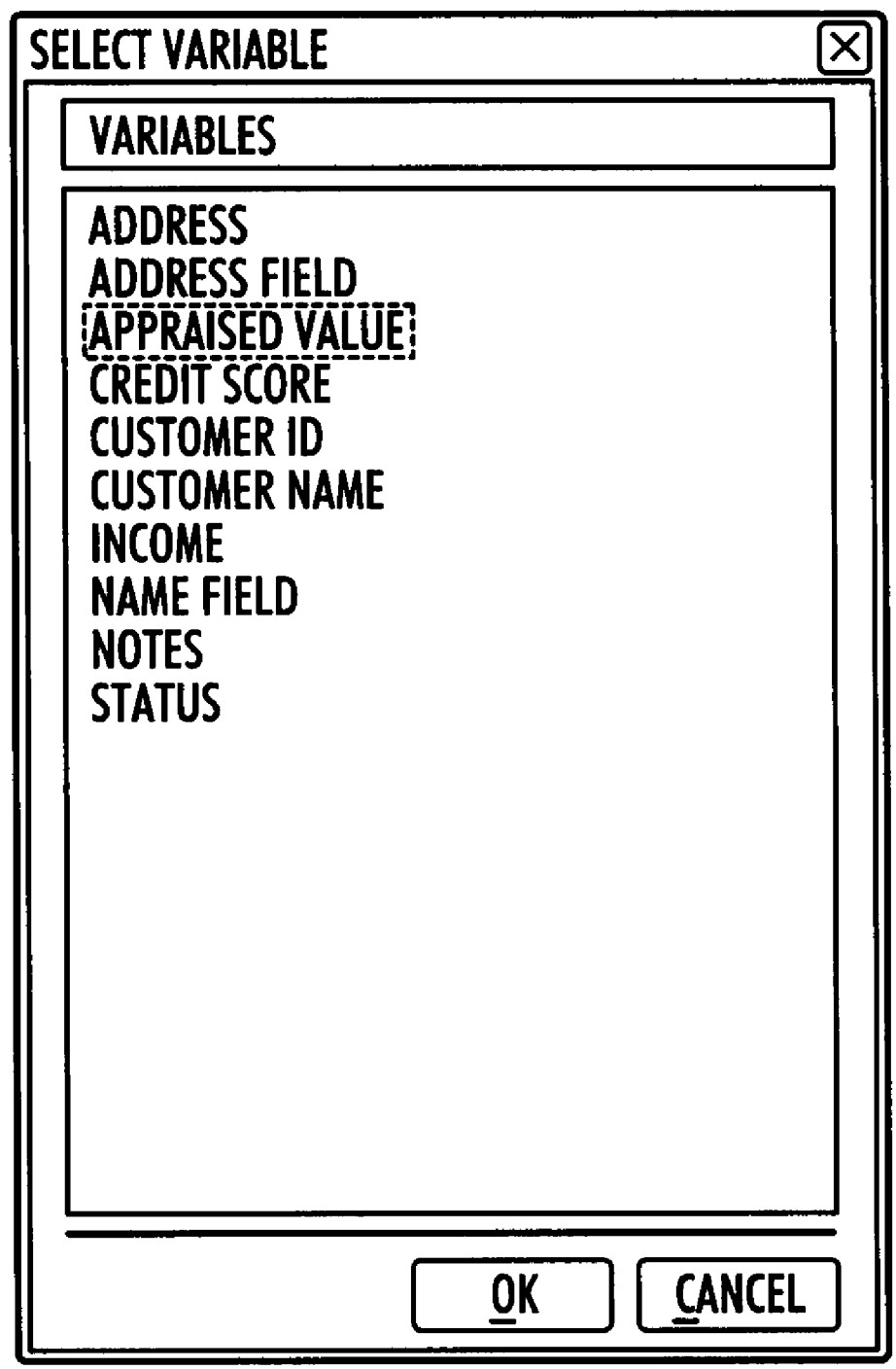
FIG. 15 presents a screen image of the Variables Update Form which is displayed when the business user adds a variable to a field in the Conditions or Functions Update Form, according to a first preferred embodiment of the present invention. Here the Appraised Value variable is being selected to populate the VALUE1 field in FIG. 14.

FIG. 15 presents a screen image of the Variables Update Form which is displayed when the business user adds a variable to a field in the Conditions or Functions Update Form, according to a first preferred embodiment of the present invention, showing selection of APPRAISED VALUE in selecting a variable for the condition of FIG. 14.

Figure 16:
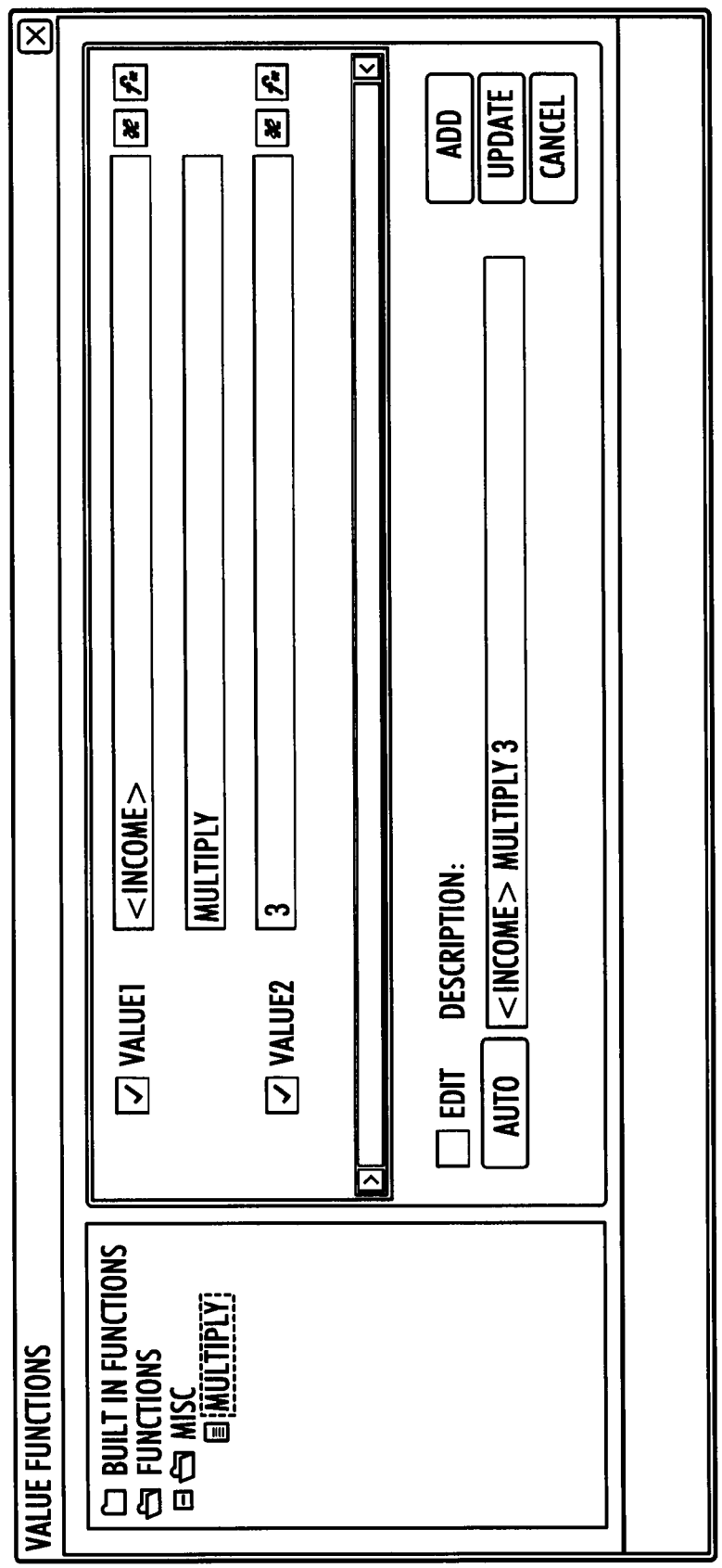
FIG. 16 presents a screen image of the Value Function Update Form which is displayed when the business user adds the return value of a function to a field in the Conditions or Functions Update Form. according to a first preferred embodiment of the present invention. Here the function call to multiply the income by 3 is being defined to populate the VALUE2 field in FIG. 14.

The user then clicks on the FUNCTION button to build the function and update VALUE2. As illustrated in FIG. 16, the appraised value, INCOME, is to be multiplied by 3.

Figure 17:
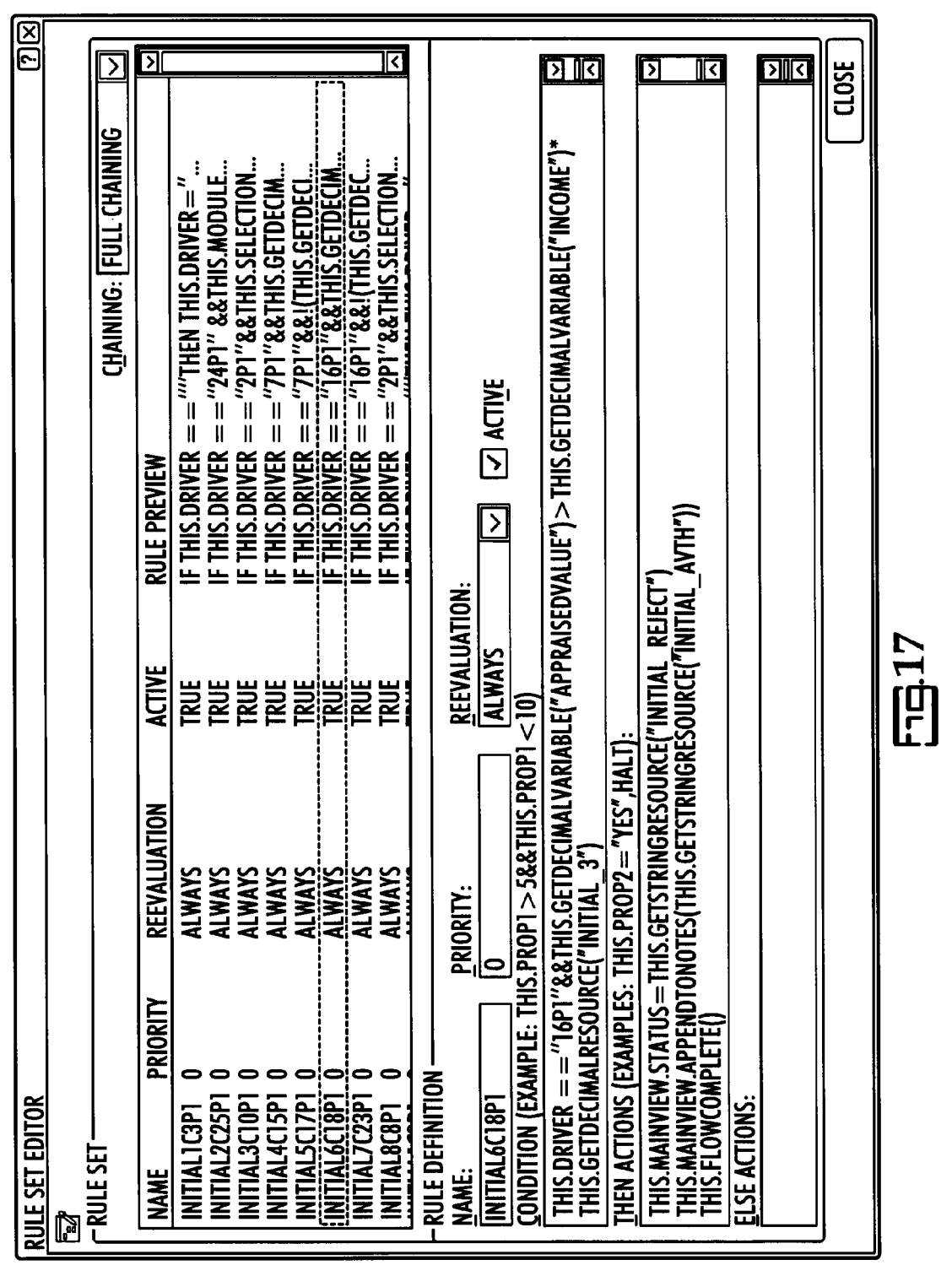

The rules are generated in this embodiment in Extensible Application Markup Language or XAML. FIG. 17 presents a screen image of a rule definition deserialized from XAML (viewed in a Rule Set Editor from Microsoft) showing the condition where the appraised value is greater than 3 times the borrower's income and the consequent Then Actions.

Figure 18:
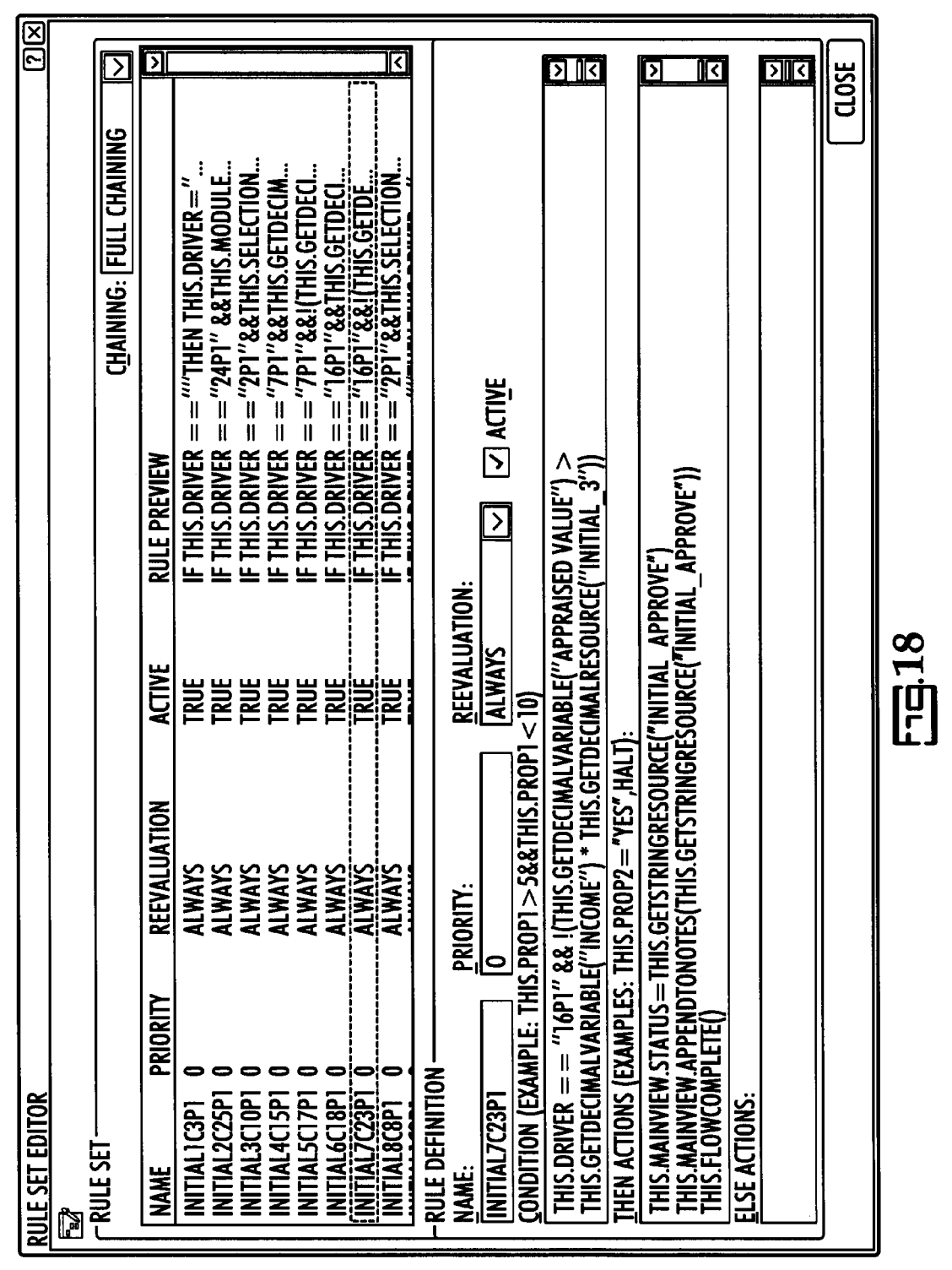

FIG. 18 presents a screen image similar to that of FIG. 17 but showing the rule when the appraised value of the house is not three times the borrower's income.

FIG. 19 presents a listing of the resource file associated with the initial module.

A second preferred embodiment of the present invention generates rules for rules engines which implement the RETE algorithm and will now be described in detail. The CLIPS Rules Engine is an example of a rules engine implementing the RETE algorithm.

1 Abstract

The Present invention is again defined in three parts:
1) A Developer Interface which performs a mapping of functions, variables and project properties between the Present invention and the business application.
2) An Editing Interface allows the business user to define the rules in the form of flow diagrams and tables using the functions and variables defined in the Developer Interface.
3) The Rules Generator then parses the flow diagrams and tables defined by the business user and using the functions and variables defined in the Developer Interface, creates rules for a rules engine implementing the RETE algorithm (e.g., CLIPS Rules Engine). The rules can then be deployed to a business application residing on the same local area network.

2 Developer Interface
2.1 Functions
Functions define the mapping between methods in the business application and the functions used in Present invention to define and generate the rules. The definition includes the following:

- Name—name visible to the user
- Summary—is used by the developer to describe the function to the business user
- Code Name—is the name used in the generated rules.
- Function Category—allows for certain special considerations for each function:
  - i. Standard—no special considerations
  - ii. Dialog—used in the Dialog shape only
  - iii. Multiple Choice—used in the Dialog shape only and uses the connectors as multiple choice options
  - iv. Remove Variable—retract a fact
  - v. Set Variable—assert a fact
- Selection Fact—used to define a template for the fact asserted to the inference engine when a selection is made by the user.
- Return Type—can be void, number, string or symbol.
- A list of parameters when necessary.

Each Parameter definition includes the following:
- Name
- Tag used for identifying a parameter
- Type can be Number, String, Symbol or Any. "Any" means the parameter can be any of the other three types.
- Control defines the type of user control available to the user in edit mode. The control can be a drop down list, a single line text box or a multi-line text box.
- Optional defines whether or not this parameter is optional for this function.
- Domain defines the list of choices for the parameter. If no choices are listed, then the user is restricted by the type alone.

2.2 Variables
- Name—name visible to the user.
- Code Name—name used in the generated rules.
- Evaluation Type—a RETE variable means the variable is defined by a RETE function. A Variable fact means the variable is a fact for the inference engine with a variable section in the fact. A Non-Variable fact is a fact for the inference engine that always has the defined value.
- Domain defines the list of choices for the variable. If no choices are listed, then the user is restricted by the type alone.
- Definition defines the fact or the function that evaluates the variable.
- Variable Type—can be Number, String or Symbol. For Non-Variable facts the variable type is NA.
- The Comments field is a field used by the developer to describe the variable to the business user.

2.3 Project Properties
Project Properties are defined in terms of applications. An application is representative of a business application. Business applications with very similar business rules can be defined in a single project.

Each application has the following properties defined:
- Name—unique name defined by present invention
- Nickname—unique name defined by the user
- Executable—executable file name
- Path to the executable
- Resource file
- Resource file deployment path
- Rules file
- Template file (used for user defined fact templates)
- Rules file deployment path
- List of excluded modules (all modules in the project are included in every application by default)

3 Editing Interface
3.1 Flow Diagrams
The flow diagram interface is preferably Microsoft Visio Drawing Control by Microsoft Corporation or equivalent. The description of this is the same for this embodiment

3.1.1 Shape Data Structures
The shape data adhere to well-defined hierarchical data structures and are stored in the shapes' custom properties.

3.1.1.1 Action Shape
The Action shape includes one or more functions. There are three categories allowed for the Action shape: Standard, Remove Variable and Set Variable.

A Standard function is a structure containing a name and a set of parameters. Each parameter can have another function or a variable as part of its value.

A Set Variable function includes a variable and a value for the variable.

A Remove Variable function includes a variable and one to many matches for the variable value. The variable will be removed from the RETE engine if any of the matches is realized.

3.1.1.2 Dialog Shape
The Dialog shape includes one function with Function category of Multiple Choice or Dialog. The data structures contain a function name and a set of parameters. Each parameter can have another function or a variable as part of its value.

3.1.1.3 Condition Shape
The Condition shape's data structure is built on functions with a Boolean return type. It holds a single Boolean function at its root. Or, And or Not, functions are predicated on inner functions in the data structure.

3.1.1.4 Decision Shape
The Decision shape's data structure holds a single variable at its root or a single Or, And or Not function. Or, And or Not, functions are predicated on inner variables. Each variable in turn is predicated on a Boolean function.

3.1.1.5 Wait Condition Shape
The Wait Condition shape's data structure is identical to the Condition shape's data structure.

3.1.1.6 Wait Decision Shape
The Wait Decision shape's data structure is identical to the Decision shape's data structure.

3.1.1.7 Question List Shape
The Question List shape's data structure has multiple questions and folders at its root. Each question has a text property, an id property, a set of variable and value pairs to be assigned when the runtime user answers Yes to a question, and a set of variable and value pairs to be assigned when the runtime user answers No to a question. Each folder can have multiple questions.

3.1.1.8 Generic Shape
The Generic shape data structure includes a name property and a value property.

3.1.1.9 Module Shape
The Module shape's data structure has the generic shape data structure. Its name property identifies the data as a Module shape data and the value field holds the module name.

3.1.1.10 Jump Shape

The Jump shape's data structure has the generic shape data structure. Its name property identifies the data as a Jump Shape data and the value field holds the unique jump pair identifier.

3.1.1.11 Connector Shape

The Connector shape's data structure includes three properties. The first is an index property that distinguishes the connector from the other connectors leaving the shape. The second is the category. The category indicates whether the connector is leaving a Dialog shape on one hand or a Condition or Decision shape on the other hand. Third, the text property holds the connector's text value. This value is always Yes/No for Condition or Decision connectors. For Dialog connectors the value is defined by the business user.

3.2 Tables

The Table Interface is a data grid with three columns: Condition, Action and Priority.

- The Condition column allows the user to set conditions based on the variables defined in the developer interface and which when satisfied, the corresponding action will execute. These variables are properties or fields in the business application.
- The Action column contains functions to be executed whenever the specified conditions are satisfied. Functions are methods defined in the business application and the developer interface.
- The Priority column allows the user to set the priority of execution of the rule relative to other activated rules.

3.2.1 Table Cell Data Structures

The cells' data adhere to well defined hierarchical data structures and are stored in adjacent hidden cells.

3.2.1.1 Condition Cell

The Condition cell data structure holds a single variable at its root or a single OR, AND, or NOT function. OR, AND, and NOT functions are predicated on inner variables. Each variable in turn is predicated on a Boolean function.

3.2.1.2 Action Cell

The Action cell includes one or more functions. There are three function types: Standard, Remove Variable and Set Variable.

- A Standard function is a structure containing a name and a set of parameters. Each parameter can have another function or a variable as part of its value. No functions of the Dialog or Multiple Choice categories are allowed in an Action cell.
- A Set Variable function includes a variable and a value for the variable.
- A Remove Variable function includes a variable and one to many matches for the variable value. The variable will be removed from the RETE engine if any of the matches is realized.

3.2.1.3 Priority Cell

The Priority cell's data structure is the generic shape data structure. Its Name property identifies the data as priority data and the Value field holds the priority of the rule.

4 Rules Generator

4.1 Flow Diagram

For logic defined in the flow diagram, rules are generated based on the shapes and the data stored within them. Sample shape sets are shown in FIG. 2.

An Initial Module shape is one the initial shapes in the flow diagram i.e. the Module Begin shape or the Begin Flow shape. An End Module shape is any of the shapes at the tail end of the flow diagram i.e. the End shape, the End Flow shape or the Terminate shape.

The generator starts with the Initial Module shape and using the connectors, walks through the entire flow diagram ending with one of the End Module shapes. The generator builds the rules as it traverses the shapes.

Each rule is based on one set of n non-connector shapes and n-1 connectors, where n is greater than 1.

The exceptions are as follows:
- Question List Shape where multiple rules are created
- Condition Shape with multiple functions
- Decision Shape with multiple variables
- Wait Condition Shape with multiple functions
- Wait Decision Shape with multiple variables A Start Rule shape is the first item in a set of shapes that define a rule and can be one of the following: Module Begin shape, Begin Flow shape, Dialog shape, Condition shape, Decision shape, Module shape, Merge shape, Wait Condition shape, Wait Decision shape or Question List shape.

An Intermediate Rule shape neither starts nor ends a rule and can only be an Action shape.

An End Rule shape can be one of the following: Module End shape, End Flow shape, Action shape, Condition shape, Decision shape, Module shape, Merge shape, Wait Condition shape, Wait Decision shape or Question List.

The End Rule shape for one rule is the Begin Rule shape for the next rule except when it is also an End Module shape. This allows the rules to be activated in sequence as dictated by the flow diagram.

A Subsequent shape is an Intermediate Rule shape or an End Rule shape. The Jump shape does not fit into any of the four categories. It only serves to connect shapes on different pages or different ends of a page, i.e., it serves the purpose of connecting two shapes that would be joined by a connector when in closer proximity.

4.1.1 Conditions

The Driver property is a condition based on the module name, Shape Index and Page Index. Its value is set by the current rule using the Shape Index and Page Index with respect to the End Rule shape. This Driver property then becomes a condition of the new rule.

The Selection property is a condition based on the first connector's value property. The multiple choice function in the business application must set the value of the Selection property when the run time user makes a selection. The Module Begin property is a condition based on the current module or an external module being invoked.

The Module End property is a condition based on the current module that is returning control to the calling module or a just completed external module.

Page Index is a unique index of a page in a document. Shape Index is a unique index of a shape on a page.

For Decision, Condition, Wait Condition and Wait Decision shapes, data conditions are defined by the variables in the data structure, the functions they are predicated on and the connector involved. A rule built around the NO Connector will contain an opposite set of conditions to the rule built for the YES Connector of the same Decision or Condition shape. Wait Condition and Wait Decision shapes have only a single blank connector leaving the shape. Their rules are identical to those built around the YES connector leaving the Condition and Decision shapes, respectively.

4.1.2 Building the Rules

A rule is based on Left Hand Side (LHS) Conditions, Right Hand Side (RHS) Conditions and Actions.

All LHS conditions must be met before the rule executes.

A RHS condition is tested only if all LHS are met.

An Action executes if all the conditions on which it is predicated are met.

Conditions are built by considering the Start Rule shape, its data and the first connector.

Actions are built by considering all the shapes and the first connector.

4.1.3 Start Rule Shape 4.1.3.1 Start Rule shape is Dialog shape, Multiple Choice function Add a Driver property to the LHS conditions basing its value on the module name, Shape Index and Page Index.

Add a Selection property to the LHS Conditions, basing its value on the first connector's text.

Build a function to remove the Selection property from the inference engine. Add the function to the Actions for this rule.

Build a function to remove the Driver property from the inference engine. Add the function to the Actions for this rule.

4.1.3.2 Start Rule Shape is Dialog Shape, Dialog Function

Add a Driver property to the LHS conditions basing its value on the module name, Shape Index and Page Index.

Add a Dialog Closed property to the LHS conditions, basing its value on the first connector's text.

Build a function to remove the Dialog Closed property from the inference engine. Add the function to the Actions for this rule.

Build a function to remove the Driver property from the inference engine. Add the function to the Actions for this rule.

4.1.3.3 Start Rule Shape is Begin Flow Shape

Add no conditions or actions 4.1.3.4 Start Rule Shape is Condition Shape 4.1.3.4.1 Condition Shape, Single Predicate, YES Connector Add the Driver property as a LHS condition basing its value on the module name, Shape Index and Page Index.

Build the Boolean function for the predicate and add it to the RHS conditions.

Build a function to remove the Driver property from the inference engine. Add the function to the Actions for this rule.

4.1.3.4.2 Condition Shape, Single Predicate, NO Connector

Add the Driver property as a LHS condition basing its value on the module name, Shape Index and Page Index.

Build the opposite of the Boolean function for the predicate and add it to the RHS conditions, i.e., add predicate equals false as a RHS condition.

Build a function to remove the Driver property from the inference engine. Add the function to the Actions for this rule.

4.1.3.4.3 Condition Shape, Multiple Predicates, OR Operator, YES Connector

Create one rule for each predicate.

For each rule add the Driver property as a LHS condition basing its value on the module name, Shape Index and Page Index For each rule build the Boolean function for the predicate and add it to the RHS conditions.

For each rule build a function to remove the Driver property from the inference engine. Add each function to the Actions for its rule.

4.1.3.4.4 Condition Shape, Multiple Predicates, OR Operator, NO Connector

Create a single rule for all predicates.

Add the Driver property as a LHS condition basing its value on the module name, Shape Index and Page Index For each predicate add to the RHS conditions the opposite of the Boolean function i.e. add predicate equals false as a RHS condition.

Build a function to remove the Driver property from the inference engine. Add the function to the Actions for this rule.

4.1.3.4.5 Condition Shape, Multiple Predicates, AND Operator, YES Connector

Create a single rule for all predicates.

Add the Driver property as a LHS condition basing its value on the module name, Shape Index and Page Index For each predicate build the Boolean function for the predicate and add it to the RHS conditions.

Build a function to remove the Driver property from the inference engine. Add the function to the Actions for this rule.

4.1.3.4.6 Condition Shape, Multiple Predicates, AND Operator, NO Connector

Create one rule for each predicate.

For each rule add the Driver property as a LHS condition basing its value on the module name, Shape Index and Page Index For each rule add to the RHS conditions the opposite of the Boolean function i.e. add predicate equals false as a RHS condition.

For each rule build a function to remove the Driver property from the inference engine. Add each function to the Actions for its rule.

4.1.3.5 Start Rule Shape is Decision Shape 4.1.3.5.1 Decision Shape, Single Predicate, YES Connector Add the Driver property as a LHS condition basing its value on the module name, Shape Index and Page Index.

If the predicate is a Fact, build the fact and add it to the LHS conditions otherwise build the Boolean function for the predicate and add it to the RHS conditions.

Build a function to remove the Driver property from the inference engine. Add the function to the Actions for this rule.

4.1.3.5.2 Decision Shape, Single Predicate, NO Connector

Add the Driver property as a LHS condition basing its value on the module name, Shape Index and Page Index.

If the predicate is a Fact, build the fact predicated by a Not function and add it to the LHS conditions (a Not function indicates that the fact must be absent from the inference engine). If the predicate is a function, build the opposite of the Boolean function for the predicate and add it to the RHS conditions, i.e., add predicate equals false as a RHS condition.

Build a function to remove the Driver property from the inference engine. Add the function to the Actions for this rule.

4.1.3.5.3 Decision Shape Multiple Predicates, OR Operator, YES Connector

Create one rule for each predicate.

For each rule add the Driver property as a LHS condition basing its value on the module name, Shape Index and Page Index For each rule if the predicate is a Fact, build the fact and add it to the LHS conditions otherwise build the Boolean function for the predicate and add it to the RHS conditions.

For each rule build a function to remove the Driver property from the inference engine. Add each function to the Actions for its rule.

4.1.3.5.4 Decision Shape Multiple Predicates, OR Operator, NO Connector

Create a single rule for all predicates.

Add the Driver property as a LHS condition basing its value on the module name, Shape Index and Page Index For each predicate if the predicate is a Fact, build a condition indicating that the fact must be absent and add it to the LHS conditions otherwise add to the RHS conditions the opposite of the Boolean function i.e. add predicate equals false as a RHS condition.

Build a function to remove the Driver property from the inference engine. Add the function to the Actions for this rule.

4.1.3.5.5 Decision Shape Multiple Predicates, AND Operator, YES Connector

Create a single rule for all predicates.

Add the Driver property as a LHS condition basing its value on the module name, Shape Index and Page Index For each predicate if the predicate is a Fact, build the fact and add it to the LHS conditions otherwise build the Boolean function for the predicate and add it to the RHS conditions.

Build a function to remove the Driver property from the inference engine. Add the function to the Actions for this rule.

4.1.3.5.6 Decision Shape Multiple Predicates, AND Operator, NO Connector

Create one rule for each predicate.

For each rule add the Driver property as a LHS condition basing its value on the module name, Shape Index and Page Index For each rule if the predicate is a Fact, build a condition indicating that the fact must be absent and add it to the LHS conditions otherwise add to the RHS conditions the opposite of the Boolean function i.e. add predicate equals false as a RHS condition.

For each rule build a function to remove the Driver property from the inference engine. Add each function to the Actions for its rule.

4.1.3.6 Start Rule Shape is Merge Shape

Add the Driver property as a LHS Condition basing its value on the module name, Shape Index and Page Index Build a function to remove the Driver property from the inference engine. Add the function to the Actions for this rule.

4.1.3.7 Start Rule Shape is Module Begin Shape

Add the Module Begin property to the LHS Conditions and set its value equal to the module name.

4.1.3.8 Start Rule Shape is Module Shape

Add a Driver property to the LHS condition basing its value on the module name, Shape Index and Page Index.

Add the Module End property to the LHS conditions and set its value equal to the external module name (i.e. the name in the Module shape).

Build a function to remove the Driver property from the inference engine. Add the function to the Actions for this rule.

Build a function to remove the Module End property whose value is based on the current external name (i.e. the name in the module shape) from the inference engine. Add the function to the Actions for this rule.

4.1.3.9 Start Rule Shape is Question List Shape

Build a Questions rule to display the questions to the user

For each question

Build a Yes rule to set selected variables to specified values if the user answers YES to the question.

Build a No rule to set selected variables to specified values if the user answers NO to the question.

Build a Proceed rule which executes after all YES and NO rules have executed. The Proceed rule has a lower priority than the YES and NO rules.

4.1.3.9.1 Question List Shape—Questions Rule

Create six lists of equal length.

An item in List1 contains the text associated with a question or folder.

An item in List2 is a list of answers (usually Yes and No) to the question. When the item in List1 is a folder, this list is empty.

An item in List3 contains the unique question or folder identification.

An item in List4 contains a node type indicator, 0 represents a question and 1 represents a folder.

An item in List5 contains the unique identification of the parent folder of the corresponding question or folder form List1. If the question is at the root, it has no parent and the value in List4 will be null.

An item in List6 is a list of other arguments related to the corresponding question or folder form List1.

Add a seventh list (List7) of arguments that can be used at the function level i.e. the items in this list are not related to individual questions or folders.

Add a Driver property to the Conditions basing its value on the Shape Index and Page Index.

Add the Dialog Closed property to the conditions and set its value to false.

Add an invocation of the Build Question function method to the Actions. Pass List1, List2, List3, List4, List5, List6 and List7 as parameters to the Build Question function method. The Build Question function must be implemented by the business application.

4.1.3.9.2 Question List Shape—Answer Rules

Create a rule for each answer.

For each rule add a Driver property to the conditions basing its value on the Shape Index and Page Index.

For each rule add the Dialog Closed property to the Conditions and set its value to true.

For each rule add a Boolean function to the conditions to determine whether the user selected the answer corresponding to this rule. The Boolean function must take the question identification and the answer identification as parameters and must be implemented by the business application.

For each rule, for each variable and value pair assigned to the answer (corresponding to this rule), build a statement setting the variable equal to the value. Add each statement to the Actions for the rule.

4.1.3.9.3 Question List Shape—Proceed Rule

Add a Driver property to the LHS conditions basing its value on the module name, Shape Index and Page Index.

Add the Dialog Closed property to the LHS conditions and set its value to true.

Build a statement that sets the Dialog Closed property to false. Add the statement to the Actions for this rule.

Build a method that clears the memory buffer of the answers selected for each question. Add the method to the Actions for this rule.

Build a function to remove the Driver property from the inference engine. Add the function to the Actions for this rule.

4.1.3.10 Start Rule Shape is Wait Condition Shape 4.1.3.10.1 Wait Condition Shape, Single Predicate Add the Driver property as a LHS condition basing its value on the module name, Shape Index and Page Index.

Build the Boolean function for the predicate and add it to the RHS conditions.

Build a function to remove the Driver property from the inference engine. Add the function to the Actions for this rule.

4.1.3.10.2 Wait Condition Shape, Multiple Predicates, OR Operator

Create one rule for each predicate.

For each rule add the Driver property as a LHS condition basing its value on the module name, Shape Index and Page Index For each rule build the Boolean function for the predicate and add it to the RHS conditions.

For each rule build a function to remove the Driver property from the inference engine. Add each function to the Actions for its rule.

4.1.3.10.3 Wait Condition Shape, Multiple Predicates, AND Operator

Create a single rule for all predicates.

Add the Driver property as a LHS condition basing its value on the module name, Shape Index and Page Index For each predicate build the Boolean function for the predicate and add it to the RHS conditions.

Build a function to remove the Driver property from the inference engine. Add the function to the Actions for this rule.

4.1.3.11 Start Rule Shape is Wait Decision Shape

4.1.3.11.1 Wait Decision Shape, Single Predicate

Add the Driver property as a LHS condition basing its value on the module name, Shape Index and Page Index.

If the predicate is a Fact, build the fact and add it to the LHS conditions otherwise build the Boolean function for the predicate and it to the RHS conditions.

Build a function to remove the Driver property from the inference engine. Add the function to the Actions for this rule.

4.1.3.11.2 Wait Decision Shape, Multiple Predicates, OR Operator

Create one rule for each predicate.

For each rule add the Driver property as a LHS condition basing its value on the module name, Shape Index and Page Index For each rule if the predicate is a Fact, build the fact and add it to the LHS conditions otherwise build the Boolean function for the predicate and add it to the RHS conditions.

For each rule build a function to remove the Driver property from the inference engine. Add each function to the Actions for its rule.

4.1.3.11.3 Wait Decision Shape, Multiple Predicates, AND Operator

Create a single rule for all predicates.

Add the Driver property as a LHS condition basing its value on the module name, Shape Index and Page Index For each predicate if the predicate is a Fact, build the fact and add it to the LHS conditions otherwise build the Boolean function for the predicate and add it to the RHS conditions.

Build a function to remove the Driver property from the inference engine. Add the function to the Actions for this rule.

4.1.4 Subsequent Shape

In general, the following specifications update the rules defined by the Start Rule shape. When the Start Rule shape is Condition shape, Decision shape, Wait Condition shape or Wait Decision shape then the specifications apply to every rule defined by the Start Rule shape. If the Start Rule shape is a Question List shape then the specifications update the Proceed rule only.

4.1.4.1 Subsequent Shape is Condition, Decision, Wait Condition, Wait Decision, Question List or Merge shape Build a Driver property basing its value on the module name, Shape Index and Page Index. Build a function to add the Driver property to the inference engine. Add the function to the Actions for this rule.

4.1.4.2 Subsequent Shape is Module Shape

Build a Module Begin property and set its value to the external module name (i.e. the name in the module shape). Build a function to add the Module Begin property to the inference engine. Add the function to the Actions for this rule.

Build a Driver property basing its value on the module name, Shape Index and Page Index. Build a function to add the Driver property to the inference engine. Add the function to the Actions for this rule.

4.1.4.3 Subsequent Shape is Dialog Shape

For each function in the data structure, get the defined parameters and build the function. Add each function to the Actions for this rule.

Build a Driver property basing its value on the module name, Shape Index and Page Index. Build a function to add the Driver property to the inference engine. Add the function to the Actions for this rule.

4.1.4.4 Subsequent Shape is End Flow Shape

Ensure that an End Flow function has been configured in the developer interface. Build the End Flow function and add it to the Actions for this rule.

4.1.4.5 Subsequent Shape is Terminate Shape

Ensure that a Terminate function has been configured in the developer interface. Build the Terminate function and add it to the Actions for this rule.

4.1.4.6 Subsequent Shape is Module End Shape

Build a function to remove the Module Begin property whose value is based on the current module name from the inference engine. Add the function to the Actions for this rule.

Build a Module End property and set its value to the current module name. Build a function to add the Module End property to the inference engine. Add the function to the Actions for this rule.

4.2 Tables

For table defined logic, the rules are generated based on the cells and the data stored within them.

4.2.1 Conditions

The Module Begin property is a condition based on the current module or an external module being invoked.

For the Condition Cell, data conditions are defined by the variables in the data structure and the functions they are predicated on.

4.2.2 Building the Rules

A rule is based on LHS conditions, RHS conditions and Actions.

All LHS conditions must be met before the rule executes.

A RHS condition is tested only if all LHS are met.

An Action executes if all the conditions it is predicated on are met.

Conditions are built by considering the data in the Condition Cell.

Actions are built by considering the data in the Action Cell.

4.2.3 Condition Cell

4.2.3.1 Condition cell, Single predicate

1. Add the Module Begin property to the LHS conditions and set its value to the module name.
2. If the predicate is a Fact, build the fact and add it to the LHS conditions otherwise build the Boolean function for the predicate and add it to the RHS conditions.

4.2.3.2 Condition Cell, Multiple Predicates, OR Operator

Create one rule for each predicate.

For each rule add the Module Begin property to the LHS conditions and set its value to the module name For each rule if the predicate is a Fact, build the fact and add it to the LHS conditions otherwise build the Boolean function for the predicate and add it to the RHS conditions.

4.2.3.3 Condition Cell, Multiple Predicates, AND Operator

Create a single rule for all predicates.

Add the Module Begin property to the LHS conditions and set its value to the module name.

For each predicate if the predicate is a Fact, build the fact and add it to the LHS conditions otherwise build the Boolean function for the predicate and add it to the RHS conditions.

4.2.4 Action Cell

The following specification updates the rules defined by the Condition cell. When there are multiple predicates and the operator is OR then the specifications apply to every rule defined by the Condition cell.

For each function in the data structure, get the defined parameters and build the function. Add each function to the Actions for this rule.

The foregoing process will be illustrated in FIGS. 20-36 in connection with the same sample process illustrated in FIGS. 3-19, namely, a portion of an automated mortgage loan application process in which the appraised value of a house is compared to three times the borrower's income. This embodiment differs from the first embodiment described above in that it generates the rules in RETE format.

As above, this sequence shows how a developer configures the functions and variables used in defining the logic of the business process to be automated and how the business user can define the application's logic after the developer has configured the functions and variables. To begin with, the developer configures the variables of the business logic, ADDRESS, APPRAISED VALUE, CREDIT SCORE, INCOME and NAME. Each of these variables has an EVALUATION TYPE that will be a VARIABLE FACT, NONVARIABLE FACT or CLIPS FUNCTION, as shown in FIG. 20. APPRAISED VALUE, CREDIT SCORE and INCOME are of the VARIABLE TYPE referred to as NUMBER, as seen in FIG. 21, rather than SYMBOL, STRING, BOOLEAN or NA. ADDRESS and NAME are of the VARIABLE TYPE referred to as STRINGS.

The developer next configures the required functions: CHOOSE, APPEND TO FIELD, SET FIELD, MULTIPLY and GETCUSTOMERDATA, as shown in FIGS. 22-26, respectively.

FIG. 22 presents a screen image of a functions configuration form for storing functions metadata that facilitates translation of the flow diagrams into rules for a rules engine implementing the RETE algorithm, according to a second preferred embodiment of the present invention. The values reflect metadata for the CHOOSE function.

FIG. 23 presents a screen image of a functions configuration form for storing functions metadata that facilitates translation of the flow diagrams into rules for a rules engine implementing the RETE algorithm, according to a second preferred embodiment of the present invention. The values reflect metadata for the APPEND TO FIELD function.

FIG. 24 presents a screen image of a functions configuration form for storing functions metadata that facilitates translation of the flow diagrams into rules for a rules engine implementing the RETE algorithm, according to a second preferred embodiment of the present invention. The values reflect metadata for the SET FIELD function.

FIG. 25 presents a screen image of a functions configuration form for storing functions metadata that facilitates translation of the flow diagrams into rules for a rules engine implementing the RETE algorithm, according to a second preferred embodiment of the present invention. The values reflect metadata for the MULTIPLY function FIG. 26 presents a screen image of a functions configuration form for storing functions metadata that facilitates translation of the flow diagrams into rules for a rules engine implementing the RETE algorithm, according to a second preferred embodiment of the present invention. The values reflect metadata for the GET CUSTOMER DATA function.

Figure 27:
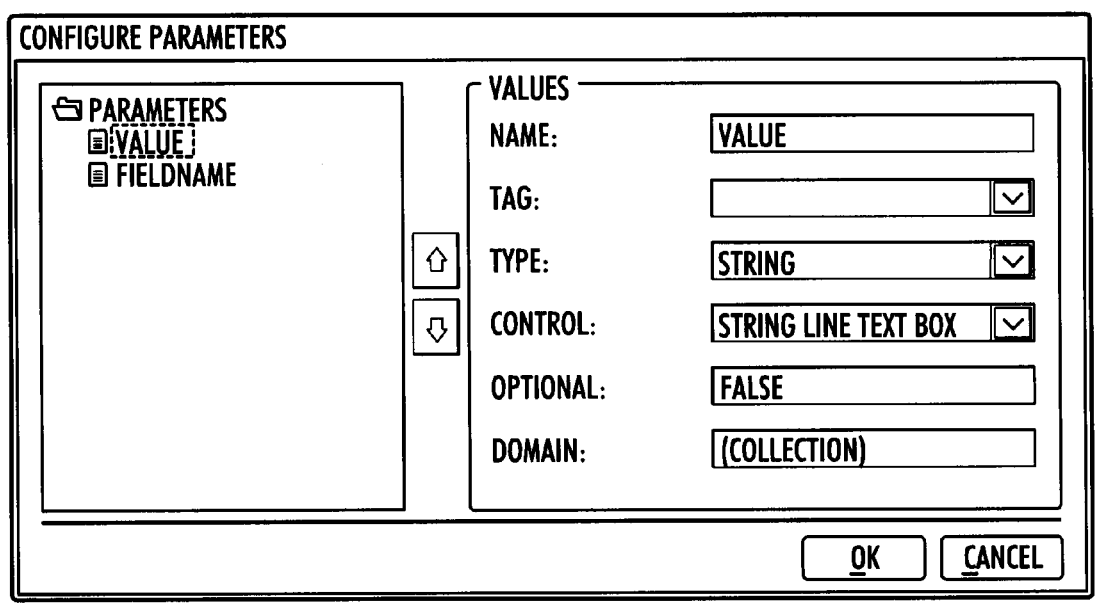
FIG. 27 presents a screen image of a parameters configuration form for storing a function's parameters metadata that facilitates translation of the flow diagrams into rules for a rules engine implementing the RETE algorithm, according to a second preferred embodiment of the present invention. The values reflect metadata for the SET FIELD function's VALUE parameter.
Figure 28:
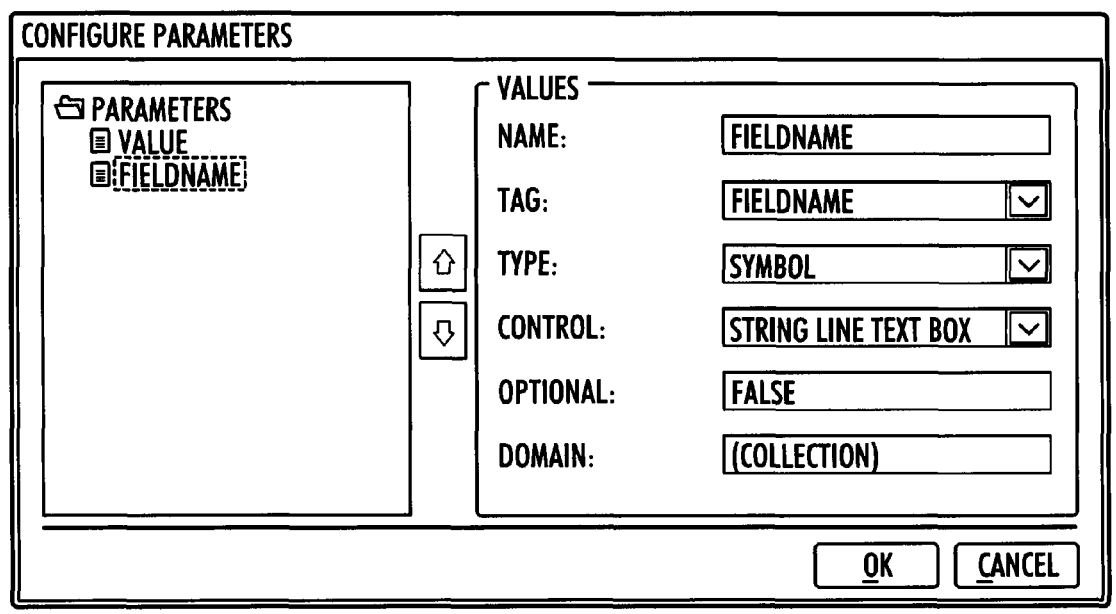
FIG. 28 presents a screen image of a parameters configuration form for storing a function's parameters metadata that facilitates translation of the flow diagrams into rules for a rules engine implementing the RETE algorithm, according to a second preferred embodiment of the present invention. The values reflect metadata for the SET FIELD function's FIELDNAME parameter.

Some functions require parameters to be configured; e.g., the SET FIELD function takes a VALUE parameter and a FIELDNAME parameter that are configured as shown in FIGS. 27 and 28.

FIG. 27 presents a screen image of a parameters configuration form for storing a function's parameters metadata that facilitates translation of the flow diagrams into rules for a rules engine implementing the RETE algorithm, according to a second preferred embodiment of the present invention. The values reflect metadata for the SET FIELD function's VALUE parameter.

FIG. 28 presents a screen image of a parameters configuration form for storing a function's parameters metadata that facilitates translation of the flow diagrams into rules for a rules engine implementing the RETE algorithm, according to a second preferred embodiment of the present invention. The values reflect metadata for the SET FIELD function's FIELDNAME parameter.

Figure 29:
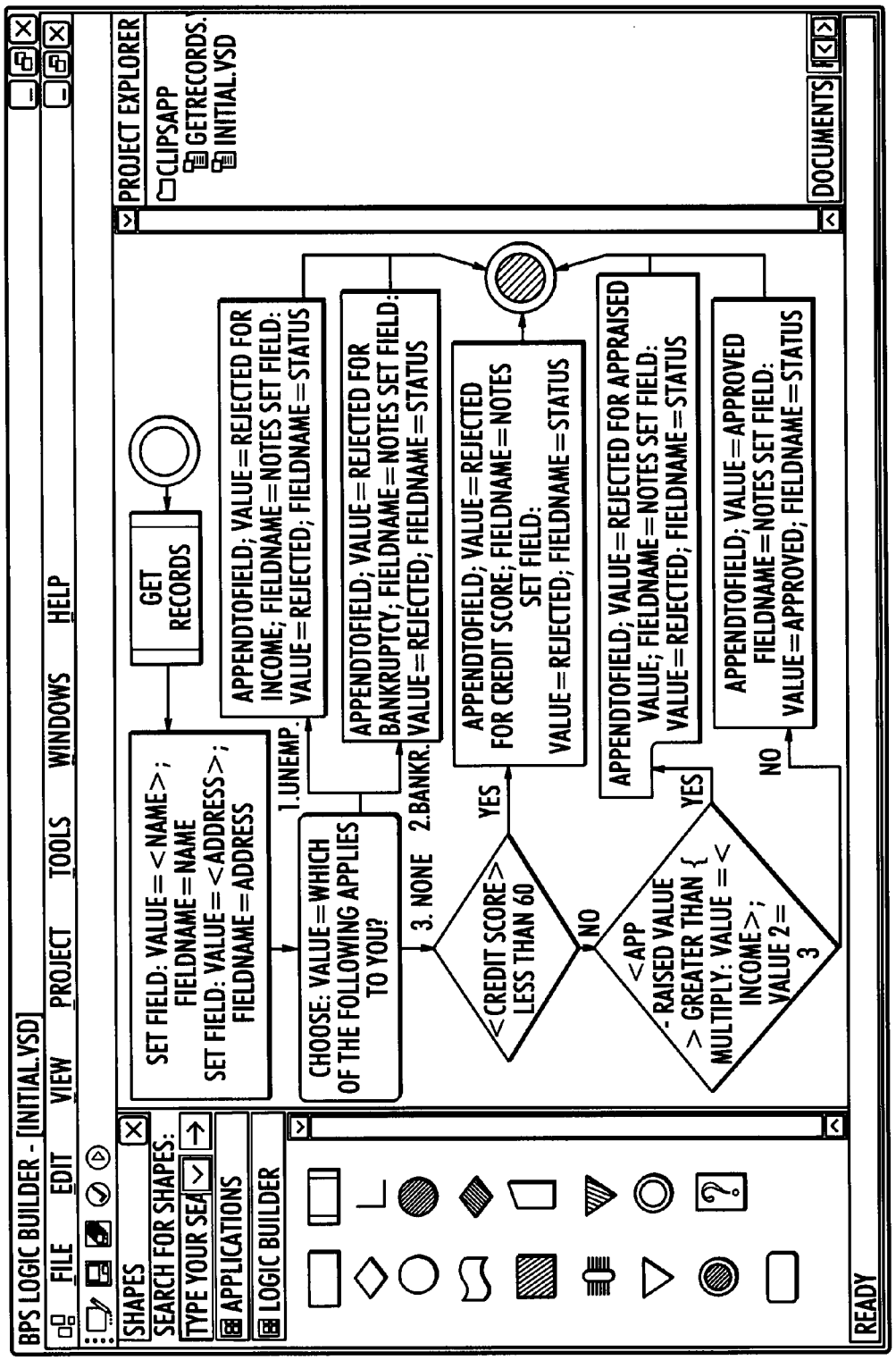
FIG. 29 presents a screen image of a flow diagram that can be translated into rules for a rules engine implementing the RETE algorithm, according to a second preferred embodiment of the present invention. The diagram defines the logic for underwriting a loan.

FIG. 29 presents a screen image of a flow diagram that can be translated into rules for a rules engine implementing the RETE algorithm, according to a second preferred embodiment of the present invention. The diagram defines the logic for underwriting a loan.

Figure 30:
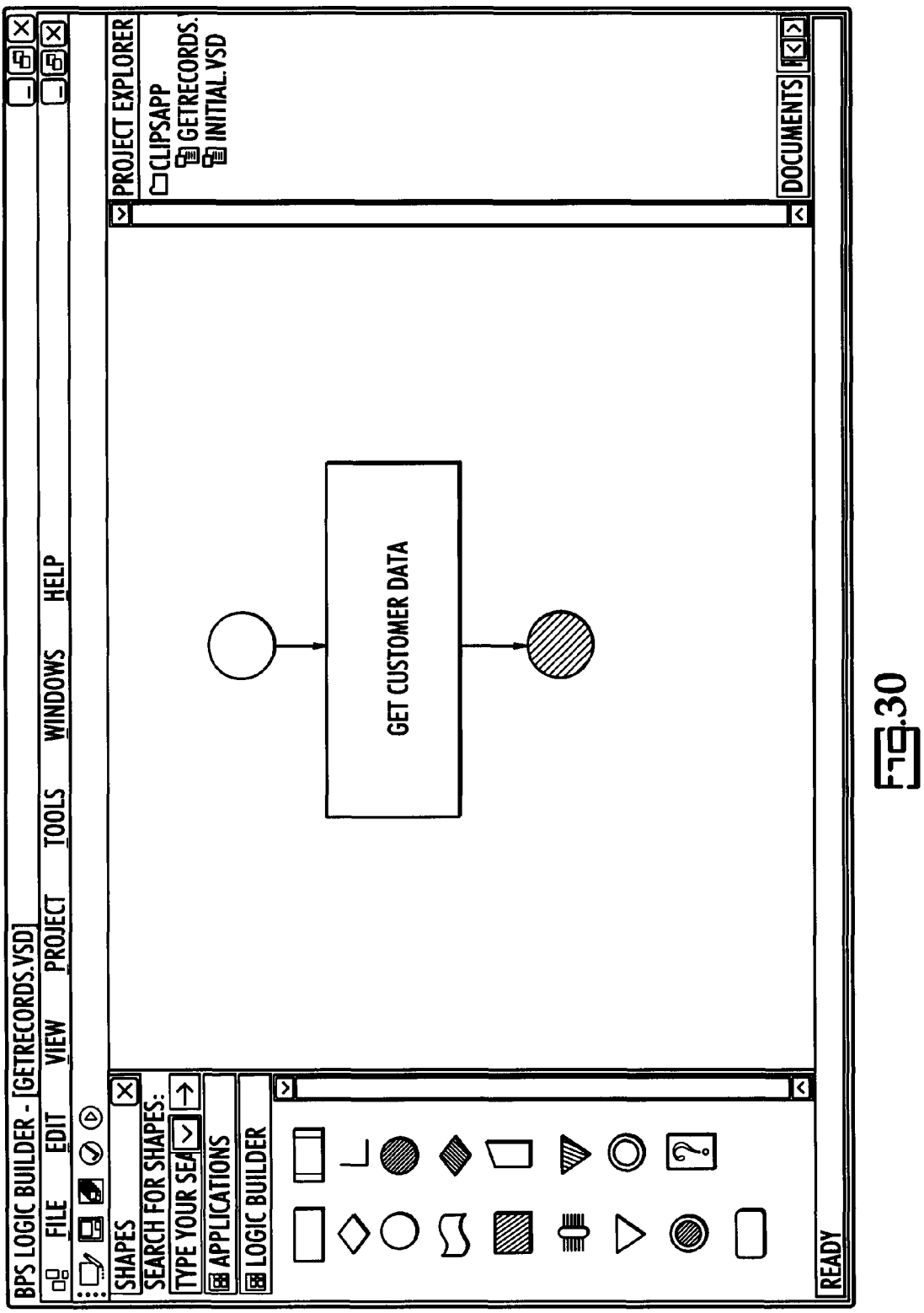
FIG. 30 presents a screen image of a flow diagram that can be translated into rules for a rules engine implementing the RETE algorithm, according to a second preferred embodiment of the present invention. The diagram represents a module invoked from the FIG. 29 diagram. Here the customer's account data is retrieved.

FIG. 30 presents a screen image of a flow diagram that can be translated into rules for a rules engine implementing the RETE algorithm, according to a second preferred embodiment of the present invention. The diagram represents a module invoked from the FIG. 29 diagram. Here the customer's account data is retrieved.

Figure 31:
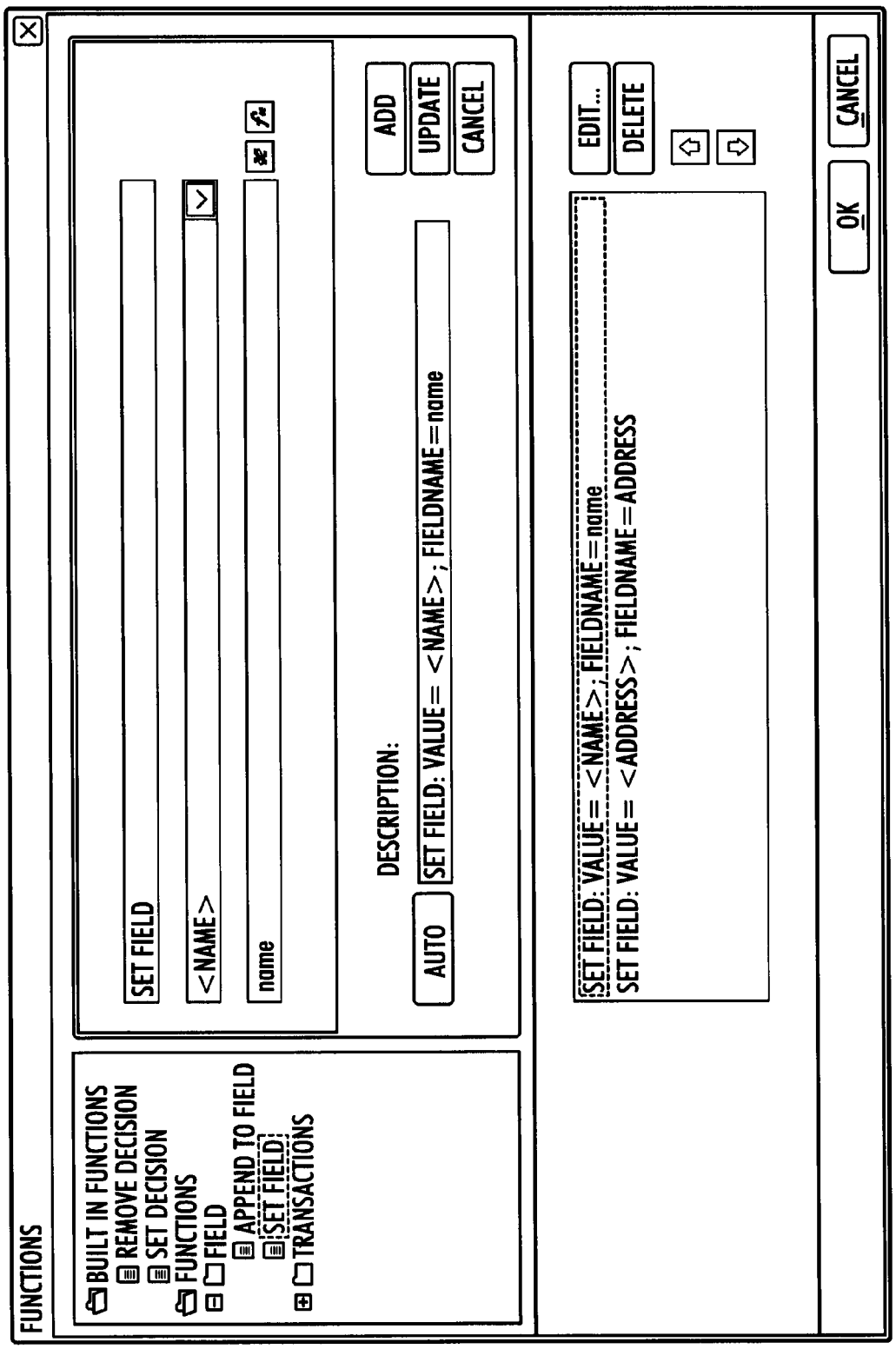
FIG. 31 presents a screen image of the Functions Update form which is displayed when the business user edits an Action Shape or a Dialog Shape in a flow diagram that can be translated into rules for a rules engine implementing the RETE algorithm, according to a second preferred embodiment of the present invention. The value of the variable representing the Name Field is being set to the value of the Name variable.

FIG. 31 presents a screen image of the Functions Update form which is displayed when the business user edits an Action Shape or a Dialog Shape in a flow diagram that can be translated into rules for a rules engine implementing the RETE algorithm, according to a second preferred embodiment of the present invention. The value of the variable representing the Name Field is being set to the value of the Name variable.

Figure 32:
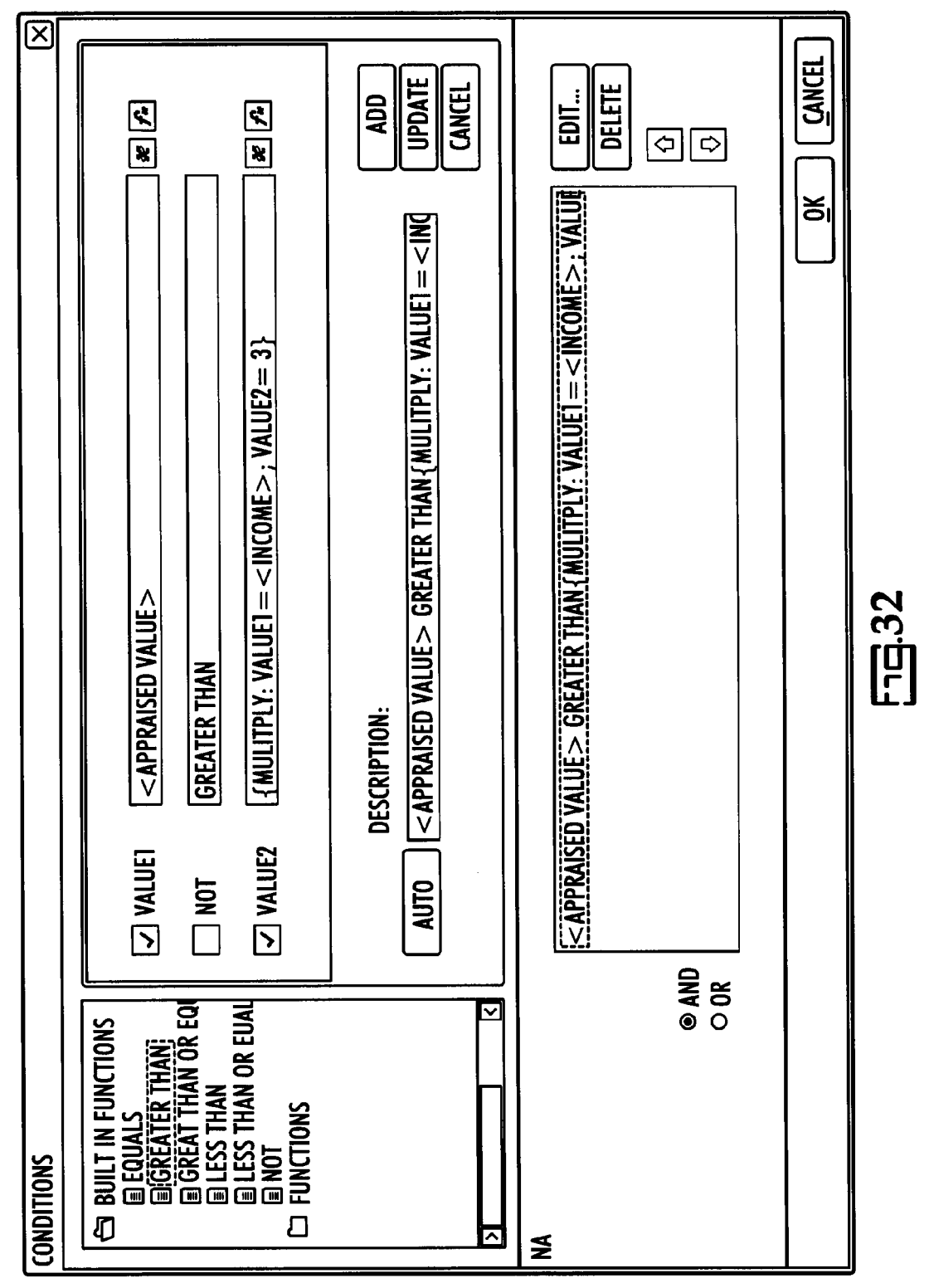

FIG. 32 presents a screen image of the Conditions Update form which is displayed when the business user edits a Condition Shape in a flow diagram that can be translated into rules for a rules engine implementing the RETE algorithm, according to a second preferred embodiment of the present invention. The condition is being defined to evaluate whether of not the appraised value of a house is greater than 3 times the customers income.

Figure 33:
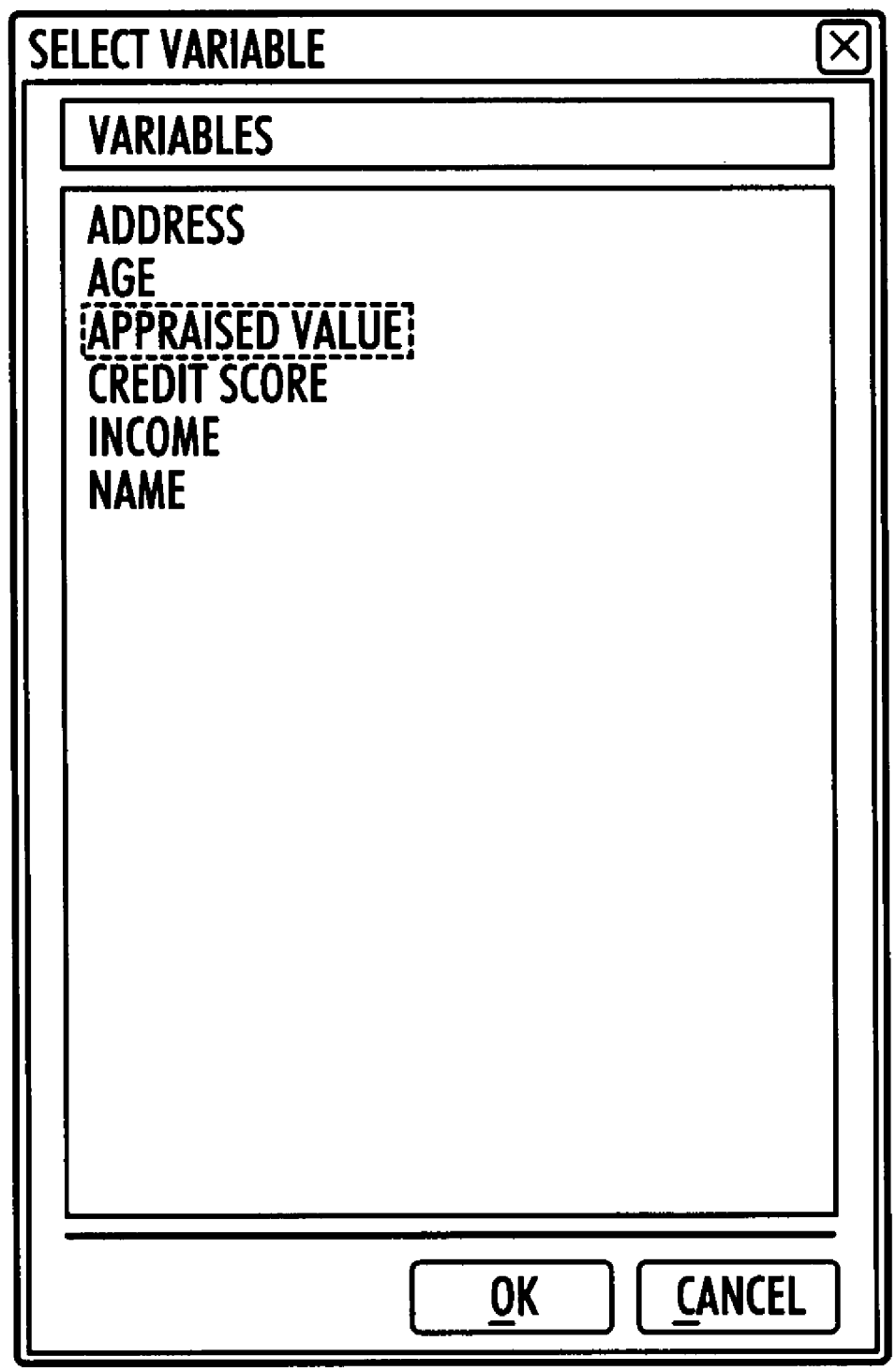
FIG. 33 presents a screen image of the Variables Update Form which is displayed when the business user adds a variable to a field in the Conditions or Functions Update Form, according to a second preferred embodiment of the present invention. Here the Appraised Value variable is being selected to populate the VALUE1 field in FIG. 32.

FIG. 33 presents a screen image of the Variables Update Form which is displayed when the business user adds a variable to a field in the Conditions or Functions Update Form, according to a second preferred embodiment of the present invention. Here the AppraisedValue variable is being selected to populate the VALUE1 field in FIG. 32.

Figure 34:
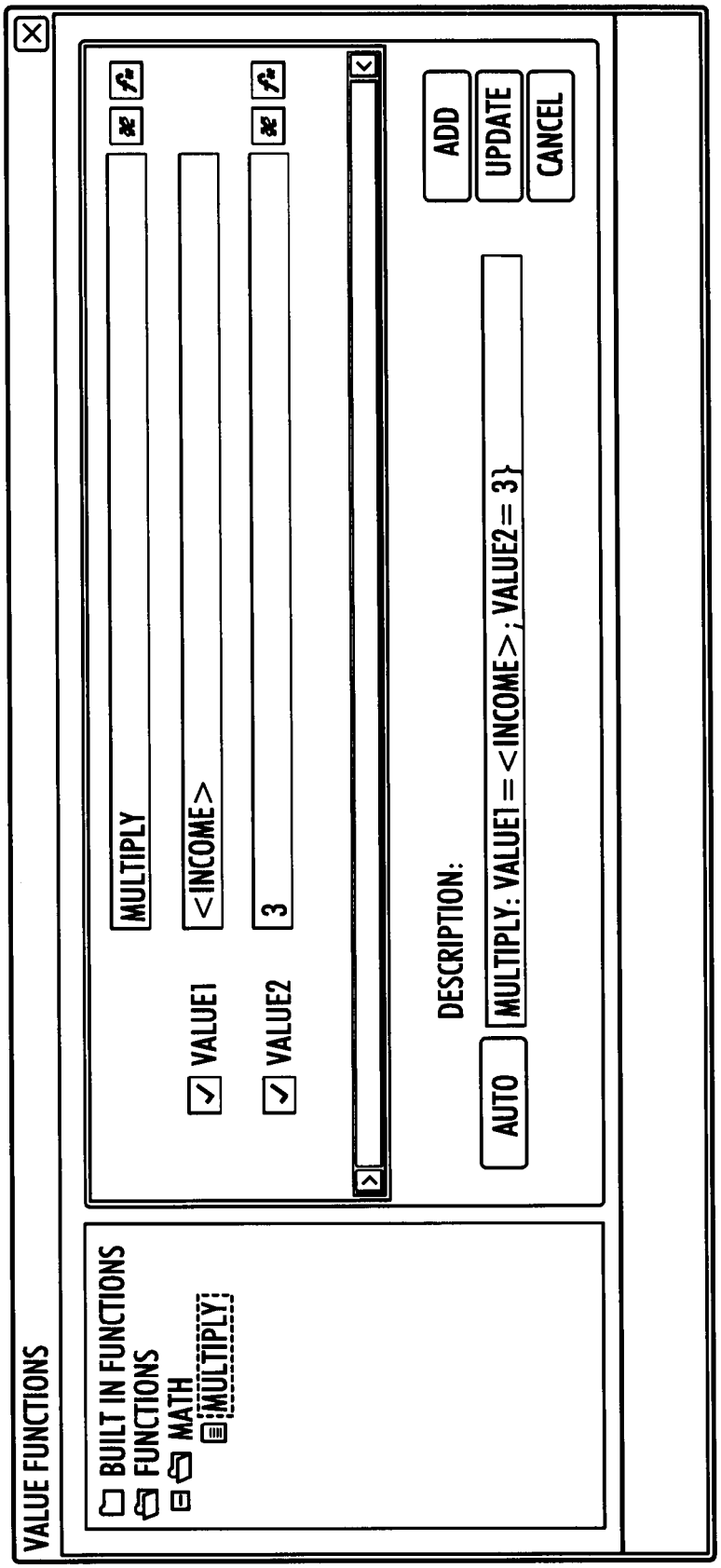
FIG. 34 presents a screen image of the Value Function Update Form which is displayed when the business user adds the return value of a function to a field in the Conditions or Functions Update Form, according to a second preferred embodiment of the present invention. Here the function call to multiply the income by 3 is being defined to populate the VALUE2 field in FIG. 32.

FIG. 34 presents a screen image of the Value Function Update Form which is displayed when the business user adds the return value of a function to a field in the Conditions or Functions Update Form, according to a second preferred embodiment of the present invention. Here the function call to multiply the income by 3 is being defined to populate the VALUE2 field in FIG. 32.

FIG. 35 presents a screen image of two rule definitions in CLIPS, according to a second preferred embodiment of the present invention, the first rule showing the condition in which the appraised value is greater than 3 times the borrower's income and the consequent Then Actions and a second rule showing the condition in which the appraised value is not greater than 3 times the borrower's income and the consequent Then Actions.

FIG. 36 presents a listing of the resource file associated with the initial module.

Those skilled in software-controlled process flow automation will appreciate that many modifications and substitutions can be made to the foregoing description of preferred embodiments without departing from the spirit and scope of the present invention, which is defined by the appended claims.

What is claimed is:

1. An apparatus implemented on a programmed computer for generating rules in a format acceptable to a rules engine for automating a business process, said business process having functions, variables and project properties, said apparatus comprising:
    a developer interface having plural dialog boxes for defining functions, variables and project properties of a business process to be automated, wherein said project properties have an activity class defined in the project properties which project properties include an executable, a path to said executable, a startup argument, a resource file, a resource file deployment path, a rules file, a rules file deployment path, and a list of excludable modules;
    an editing interface for designing a flow diagram using shapes and connectors selected from a pre-selected list of shapes and connectors, said flow diagram being based on said business process, said shapes and connectors being software objects carrying said functions and variables; and
    a rules generator that parses said flow diagram and, using said functions and variables carried by said shapes and connectors, generates rules in a form adapted for use by a rules engine for automatically implementing said business process.

2. The apparatus as recited in claim 1, wherein said functions include dialog functions, multiple choice functions, and set variable functions.

3. The apparatus as recited in claim 2, wherein said functions further include binary operators.

4. The apparatus as recited in claim 2, wherein said functions further include remove variable functions.

5. The apparatus as recited in claim 1, wherein said variables are field variables or property variables.

6. The apparatus as recited in claim 1, wherein said variables have a reference name and a reference category.

7. The apparatus as recited in claim 1, wherein said variables are implemented or automatic, said implemented variables requiring implementation by a developer.

8. The apparatus as recited in claim 1, wherein said variables are of a type selected from the group consisting of Boolean, DateTime, String, Char, Decimal, Single, Double, Byte, Int16, Int32, Int64, SByte, UInt16, UInt32 or UInt64.

9. The apparatus as recited in claim 1, wherein said variables include an evaluation type, a domain and a variable type.

10. The apparatus as recited in claim 9, wherein said evaluation type may be a RETE function, a variable fact or a non-variable fact.

11. The apparatus as recited in claim 9, wherein said domain defines a list of choices for said variable.

12. The apparatus as recited in claim 9, wherein said variable type is a number, string or symbol.

13. The apparatus as recited in claim 1, wherein said shapes are selected from the group consisting of Action, Dialog, Module, Decision, Connector, Module Begin, Module End, Begin Flow, End Flow, Jump, Condition, Terminate, Wait Decision, Wait Condition, Question List and Update Variables shapes and combinations thereof.

14. The apparatus as recited in claim 13, wherein said Connector shape has an index property, a category property, and a text property, said index property being used to distinguish said Connector shape from a different Connector shape, and wherein said category property indicating whether said Connector shape is leaving a Dialog shape, a Condition shape, or a Decision shape, and wherein said text property holds said text value.

15. The apparatus as recited in claim 14, wherein said text value is yes or no for said connector shape when said connector shape is leaving said condition shape and said decision shape.

16. The apparatus as recited in claim 13, wherein said shapes contain data stored as meta data, and wherein said rules generator parses said flow chart by basing said rules on shapes and data stored within said shapes.

17. The apparatus as recited in claim 1, where each rule is based on a first number of said shapes and a second number of said connectors, said second number being one less than said first number.

18. The apparatus as recited in claim 1, wherein said rules include start rule shapes, intermediate rule shapes and end rule shapes.

19. The apparatus as recited in claim 18, wherein said intermediate shapes are always action shapes.

20. The apparatus as recited in claim 18, wherein said end rule shapes of one rule may be start rule shapes of a different rule.

21. The apparatus as recited in claim 13, wherein said shapes are characterized by conditions defined by properties, said properties including a driver property, a selection property, a module begin property, and a module end property.

22. The apparatus as recited in claim 21, wherein said selection property is set by the user at run time when a multiple choice function is invoked.

23. A method of generating rules for a rules engine to implement a business process, said method comprising the steps of:
    (1) defining, using a programmed computer, a business process in terms of functions and variables;
    (2) storing on said computer metadata for functions and variables used in shapes and connectors;
    (3) constructing, using said computer, a process flow diagram according to said business process with objects selected using an object-based software programming language, said objects being the shapes and connectors, said objects having project properties wherein each project property has an activity class defined in the project properties including an executable, a path to said executable, a startup argument, a resource file, a resource file deployment path, a rules file, a rules file deployment path, and a list of excludable modules;

(4) parsing, using said computer, said process flow diagram and said properties of said shapes and connectors of said process flow diagram for rules regarding said process;
(5) generating using said computer said rules in a software language readable by a rules engine;
(6) defining, using said computer, the sequence of execution of said rules by using index values associated with the shapes and page numbers of the Start Rule Shapes and End Rule Shapes;
(7) generating, using said computer, menus for display at run time based on multiple choice dialog functions and the associated connectors; and
(8) defining, using said computer, the sequence of execution of said rules by generating choices for the runtime user based on the connectors leaving the dialog shape.

* * * * *